US005465035A

United States Patent [19]
Scaramuzzo, Jr. et al.

[11] Patent Number: 5,465,035
[45] Date of Patent: Nov. 7, 1995

[54] BAND LIMITED CONTROL OF A FLEXIBLE STRUCTURE USING PIECEWISE TRIGONOMETRIC INPUT SIGNALS

[75] Inventors: John A. Scaramuzzo, Jr., Natick; Roger W. Brockett, Lexington, both of Mass.

[73] Assignee: Quantum Corporation, Milpitas, Calif.

[21] Appl. No.: 60,388

[22] Filed: May 11, 1993

[51] Int. Cl.⁶ ........................................ G11B 5/55
[52] U.S. Cl. ........................ 318/561; 318/778; 318/274
[58] Field of Search .................... 318/560, 561, 318/567, 568.1, 568.24, 757, 763, 764, 778, 779, 273, 274, 276; 360/78.01, 78.04, 78.06, 78.07, 78.14

[56] References Cited

U.S. PATENT DOCUMENTS

| | | | |
|---|---|---|---|
| 4,342,379 | 8/1982 | Games et al. | 318/561 X |
| 4,488,189 | 12/1984 | Axmear et al. | 318/571 X |
| 4,491,776 | 1/1985 | Veale | 318/561 |
| 4,532,463 | 7/1985 | Tanaka | 318/616 |
| 4,777,609 | 10/1988 | Cavill et al. | 318/599 X |
| 5,073,748 | 12/1991 | Boehm | 318/569 |
| 5,111,349 | 5/1992 | Moon | 318/560 X |
| 5,119,250 | 6/1992 | Green et al. | 318/561 X |
| 5,121,327 | 6/1992 | Salazar | 318/696 X |
| 5,225,757 | 7/1993 | Burtie | 318/696 |
| 5,254,920 | 10/1993 | Agarwal et al. | 318/560 |
| 5,331,263 | 7/1994 | Sagae et al. | 318/560 |

OTHER PUBLICATIONS

Singer, N. C. and Seering, W. P., "Preshaping Command Inputs to Reduce System Vibration," Transactions of the ASME, vol. 112, Mar. 1990, pp. 76–82.
Meckl, P. H. and Seering, W. P., "Minimizing Residual Vibration for Point-to-Point Motion," Transactions of the ASME, vol. 107, Oct. 1985, pp. 378–382.
Meckl, Peter Heinrich, "Control of Vibration in Mechanical Systems Using Shaped Reference Inputs," PhD thesis, Department of Mechanical Engineering, MIT, 1988, also AI–TR–1030, The Artifical Intelligence Laboratory, Massachusetts Institute of Technology, Cambridge, Mass.

*Primary Examiner*—William M. Shoop, Jr.
*Assistant Examiner*—Brian Sircus
*Attorney, Agent, or Firm*—David B. Harrison

[57] ABSTRACT

A method and apparatus for moving a member provides parameters related to a given destination position of the member and corresponding to a switch time, a final time, an acceleration amplitude, and a deceleration amplitude. These parameters are used to specify a piecewise continuous function of time as an input signal. The input signal feeds a motor to move the member. The final time, switch time, acceleration amplitude, and deceleration amplitude are specified by iteratively providing minimal values for the switch time and final time while providing maximum acceptable values for the acceleration amplitude and deceleration amplitude for each possible given change in a characteristic of the movable member. A pre-shaped input signal is thereby provided which is bandwidth limited such that its energy is concentrated below the frequency of the lowest system resonance, since the signal is a piecewise continuous function comprising concatenated raised cosine and constant functions. The input signal may be asymmetrical and may have acceleration and deceleration amplitudes which differ in magnitude, and thus is useful in systems where it is desirable to the limit frequency content of an input signal while compensating for the effects of back EMF voltage. Since only four parameters are needed to specify the input signal, the signal is easy to construct, and it thus practical for use in high density disk drive applications.

26 Claims, 16 Drawing Sheets

BAND LIMITED CONTROL OF A FLEXIBLE STRUCTURE USING PIECEWISE TRIGONOMETRIC INPUT SIGNALS

BACKGROUND OF THE INVENTION

The invention relates generally to magnetic disk data storage devices, and more particularly to controlling a mechanical arm used in the disk storage device.

As it is known in the art, computer systems generally include a central processor unit and a random access memory which are coupled together via a system bus. In order to store large quantities of data for use by the computer system it is known to use a magnetic disk storage device. Magnetic disk storage devices typically include a plurality of disks which rotate at a preselected speed, and an elongated flexible mechanical member commonly called an actuator. The actuator moves in a radial direction across the rotating disks in response to a drive signal which feeds a motor that controls its movement. Magnetic read/write heads at the end of the actuator are used to read and write data on the disk.

As computer processor speeds increase, there is a concomitant need to decrease access times to information stored on mass storage devices such as hard disk drives. In order to access information quickly, it is desirable for the actuator of a disk drive to be able to change its position rapidly.

In order to achieve swift motion of the actuator, it has generally been the accepted approach to feed time optimal square wave drive signals to the motor. In the art, such square wave signals are known as "bang-bang" forcing functions. One problem with these "bang-bang" forcing functions is that, rather than improve access time, they can have a detrimental effect on access times due to the characteristics of the components of the disk drive.

In particular, the read/write heads in the disk drive are attached to thin flexible cantilever beam structures or arms to provide in combination an actuator. An actuator arm has several mechanical flexible modes. The broad-banded power spectrum associated with the "bang-bang" square wave input command drive signal is likely to excite some of these modes, resulting in radial perturbations in head position relative to the track to be written or read. These perturbations may be large enough to delay the access or storing of data until the movement of the head decreases to an acceptable range. In addition, energy resulting from exciting these modes may fall within the human acoustic range and may be unpleasant to the ear.

One technique used to avoid the excitation of flexible modes was mentioned in a publication entitled "Minimizing Residual Vibration for Point-to-Point Motion", by P. H. Meckl and W. P. Seering. This technique provided a method of constructing an input forcing function by adding separate ramped sinusoids of selected frequencies to approximate a square wave input. The frequencies of the ramped sinusoidal functions are selected to control the frequency spectrum of the input forcing function. One problem with this approach is that the shape of the resultant forcing functions is very complicated. The necessary amount of data storage or computation time required to produce these complicated forcing functions renders them impractical for disk drive applications, particularly where fast access times are necessary. Another problem with this approach is that the shape of the resultant class of inputs is necessarily symmetrical. This may result in less than optimal performance, since the rotation of the voice coil type motor caused by the input drive signal causes a back EMF voltage which affects portions of the input drive signal differently.

Another approach to pre-shaping command inputs is described in a publication entitled "Preshaping Command Inputs to Reduce Telerobotic System Oscillations" by N. C. Singer and W. P. Seering. According to this method, an input forcing function is provided which is a linear combination of delayed versions of the original (in this case the "bang-bang") input forcing function. The resonant modes are excited by the series of delayed command inputs. By properly choosing the delays, however, the phase of the resulting vibrations will cancel. One problem with this method is that although allowing the cancellation of specific resonant modes at particular chosen frequencies, it is not practical for cancelling many modes, especially those whose resonant frequencies vary with time. In addition, this class of input signals is not necessarily band limited; thus, higher frequency modes which cause a significant portion of the acoustical noise may still be excited.

SUMMARY OF THE INVENTION

In accordance with the present invention, a method of moving a member includes the steps of providing parameters related to a given desired position of the member, the parameters corresponding to a switch time, a final time, an acceleration amplitude, and a deceleration amplitude; using the parameters to specify a piecewise continuous function of time for an input signal; and feeding the input signal to a motor to move the member.

With such an arrangement, a parametrized family of pre-shaped input signals is provided to move the member. The family of signals is has an energy distribution which is concentrated below the frequency of the lowest system resonance. Because only four parameters are needed to specify the input signal for a given move, the signal is easy to compute and convert to an input signal practical for use, illustratively in moving an actuator arm in a disk drive application, or in moving a robotic arm in a robotic application.

In accordance with a further aspect of the present invention, apparatus for moving a member includes means for providing parameters related to a given destination position of the member and corresponding to a switch time, a final time, an acceleration amplitude, and a deceleration amplitude of a signal used to control movement of the member. The apparatus further includes means responsive to said parameters for generating an input signal which is a piecewise continuous function of time, and means for feeding the input signal to a motor for moving the member.

In accordance with a further aspect of the present invention, a method includes the steps of configuring a processor to provide a piecewise continuous function of time specified by a final time, a switch time, an acceleration amplitude, and a deceleration amplitude. In a preferred embodiment this method includes the steps of providing a memory containing values representing a final time, a switch time, an acceleration amplitude, and a deceleration amplitude, and configuring a processor to provide a piecewise continuous function of time specified by the final time, the switch time, the acceleration amplitude, and the deceleration amplitude. The step of providing a memory containing values representing a final time, a switch time, an acceleration amplitude, and a deceleration amplitude further includes the step of iteratively providing minimal values for the switch time and final time while providing maximum acceptable values for the acceleration amplitude and deceleration amplitude for each possible given change in a characteristic of a movable member. With such an arrangement, parameters are provided for fully and simply specifying a piecewise continuous input signal. The parameters describe an input signal with controlled frequency content which may be asymmetrical and which may have acceleration and deceleration amplitudes which differ in magnitude, and thus is practical for use in voltage limited systems where it is desirable to the limit frequency content of an input signal while compensating for the effects of back EMF voltage, such as in high density disk drive applications.

DETAILED DESCRIPTION OF THE PREFERRED EMBODIMENT

Figure 1:
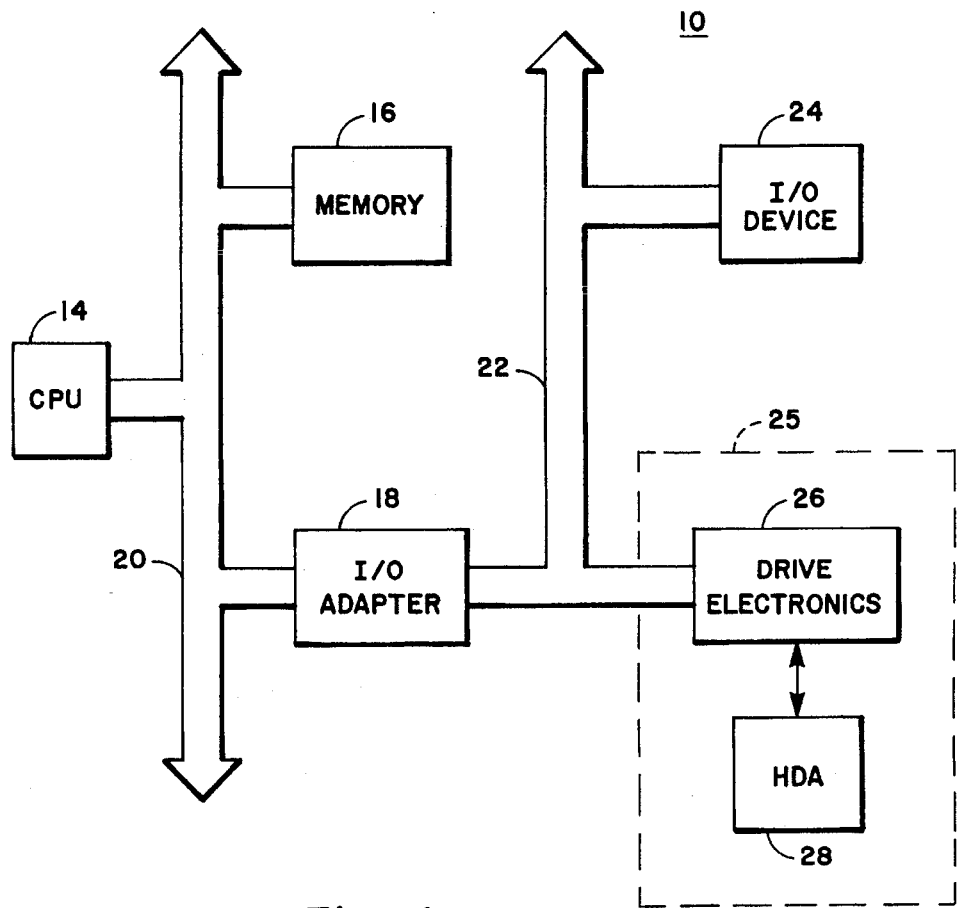
FIG. 1 is a block diagram of a computer system including a disk storage system.

Referring now to FIG. 1, computer system 10 is shown to include a central processing unit (CPU) 14, a main memory 16, and I/O bus adapter 18, all interconnected by system bus 20. Coupled to I/O bus adapter 18 is an I/O bus 22, which may be for example a small computer system interconnect (SCSI) bus, and which supports various peripheral devices 24 including a disk storage unit 25. The disk storage unit 25 includes drive electronics 26 and a head disk assembly 28 (HDA).

Figure 2:
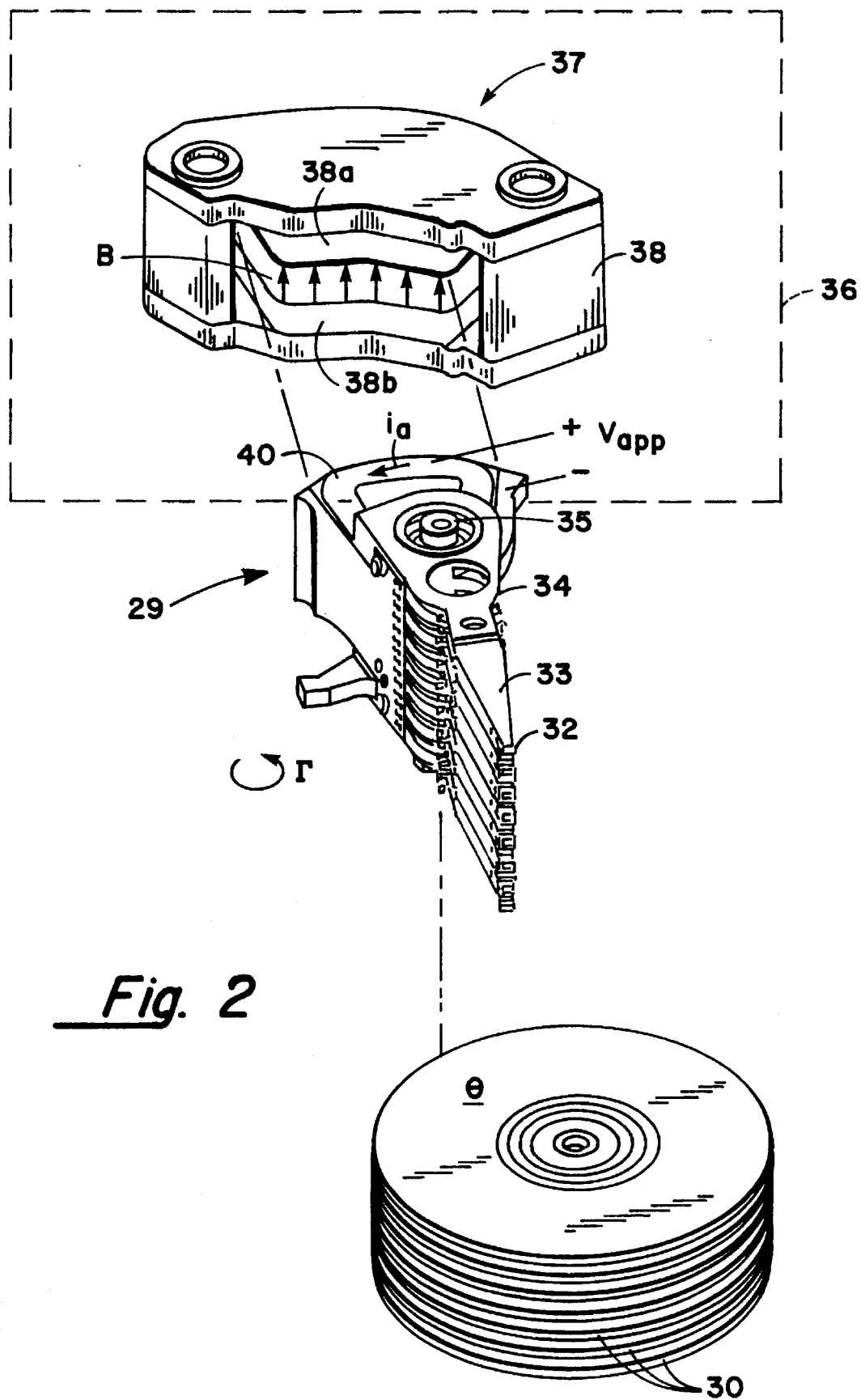
FIG. 2 is a mechanical assembly drawing of the head disk assembly of FIG. 1.

Referring now to FIG. 2, the HDA 28 is shown to further include an actuator 29, and disks 30 on which data are stored. Data are stored on the disks 30 in concentric circular tracks. Data are written and read from the disks 30 in a conventional manner via magnetic heads 32 which are attached to flexible load beams 33 extending from actuator arms 34. The actuator arms 34 pivot about point 35 to move the load beams 33 in a radial direction over the surfaces of the disks 30 towards a destination position, designated Θ. At the destination position the magnetic heads 32 may read from or write data to tracks on the disks 30. A motor 36 controls the radial movement of the actuator arms 34.

The motor 36 is shown to include a magnet 37 containing two plates coupled together via a pair of sidewalls to form a flat toroidal shaped member 38. A wire coil 40 is disposed between the two plates 38a and 38b. The magnet 38 generates a constant magnetic field B between the plates 37a and 37b. When a current $i_a$ is induced in the coil 40 disposed in the magnetic field B, a torque τ is produced on the actuator arms 34 resulting in radial motion of the arms 34 about pivot point 35. The polarity of the current $i_a$ determines the direction of radial motion of the actuator arms 34.

Figure 3:
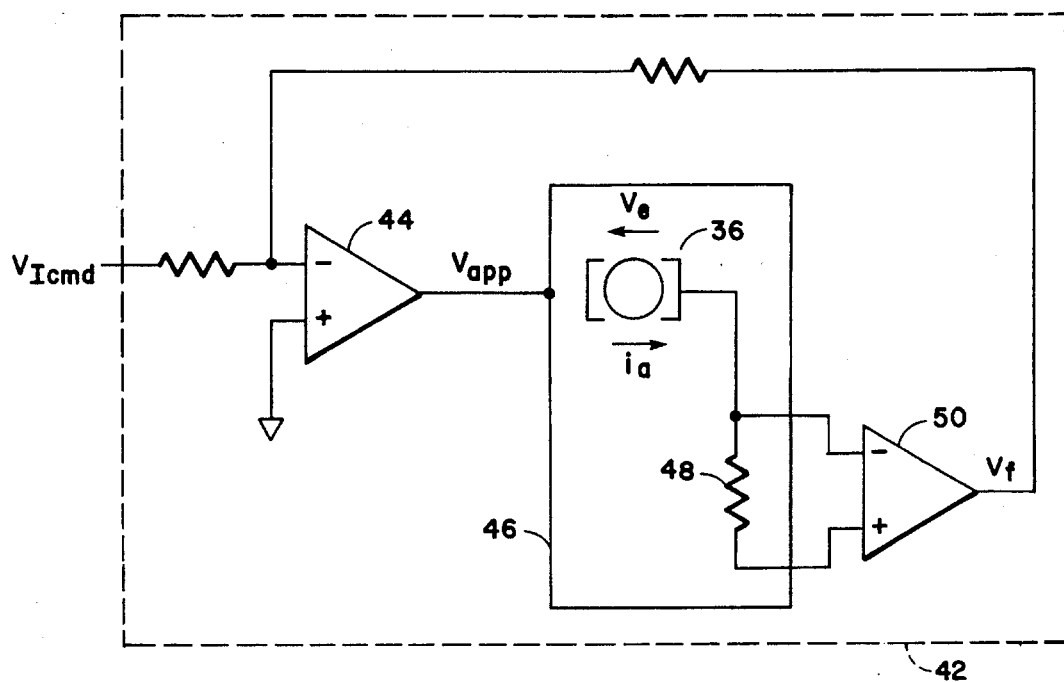
FIG. 3 is a schematic drawing of the motor drive circuit for driving the motor 36 shown in FIG. 2.

Referring now to FIG. 3, there is shown the motor 36 disposed within a transconductance amplifier circuit 42 which is fed a drive signal $V_{Icmd}$ for inducing the current $i_a$ in the coil 40. The transconductance amplifier 42 includes an error amplifier 44 which amplifies the error between the drive signal $V_{Icmd}$ and the feedback voltage $V_f$ from a feedback amplifier 50 and feeds an applied voltage $V_{app}$ to a bridge circuit 46 for driving the coil 40. The bridge circuit 46 includes a sense resistor 48, which is fed by the coil current $i_a$ to produce a proportional voltage which is amplified by a feedback amplifier 50 to provide the feedback voltage $V_f$. The feedback voltage $V_f$ is summed with the input drive signal $V_{Icmd}$. Further, as the coil 40 moves through the magnetic field B, a back EMF voltage $V_e$ is induced in the coil 40. Generally this back EMF voltage $V_e$ is undesirable because it tends to distort or disturb the applied voltage signal $V_{app}$ driving the motor 36.

Figure 4:
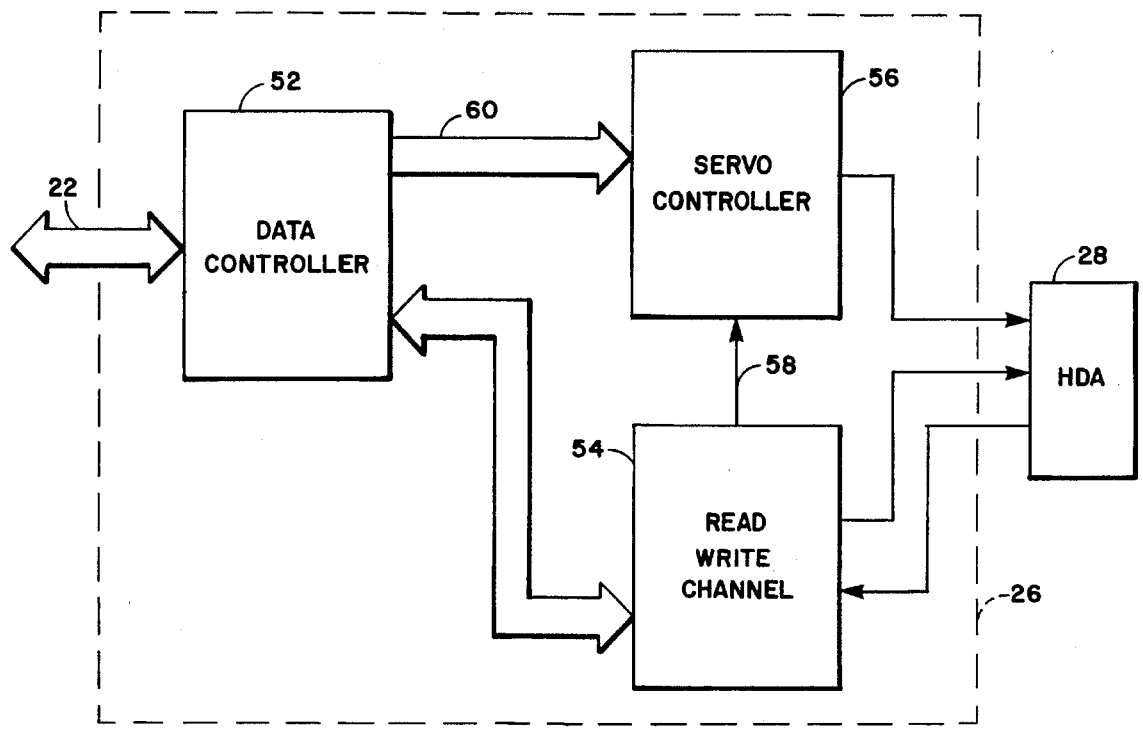
FIG. 4 is a block diagram of the drive electronics of FIG. 1 including a servo controller.

Referring now to FIG. 4, the drive electronics 26 (FIG. 1) is shown to include a data controller 52, a read/write channel 54, and a servo controller 56. A typical data transfer initiated by the CPU 14 to the disk storage unit 25 may involve for example a DMA transfer of data from the memory 16 onto the system bus 20 (FIG. 1). Data from the system bus 20 are fed by the I/O adapter 18 onto the I/O bus 22. The data are read from the I/O bus 22 by the data controller 52, which formats the data into blocks with the appropriate header information and feeds the digital data to read/write channel 54.

The read write channel 54 operates in a conventional manner to convert data between the digital form used by the data controller 52 and the analog form used by the magnetic heads 32. For the transfer from the CPU 14 to the HDA 28, the read write channel 54 converts the data to an analog form suitable for writing by the magnetic head 32 to the HDA 28. The read write channel also feeds servo positional information read from the HDA 28 to the servo controller 56 on lines 58 in a conventional manner.

Data controller 52 also provides destination track position data on lines 60 to the servo controller 56. The destination track position data on lines 60 provides course positioning information to the servo controller 56 for specifying a move length. The move length is the radial distance that the actuator arm 34 must move to reach the track to which the CPU 14 has requested access. Servo controller 56 uses the move length data on lines 60 and the servo positioning information on lines 58 to generate in response an input current command $V_{Icmd}$ resulting in controlled movement of the actuator arm 34 as will be described.

Figure 5:
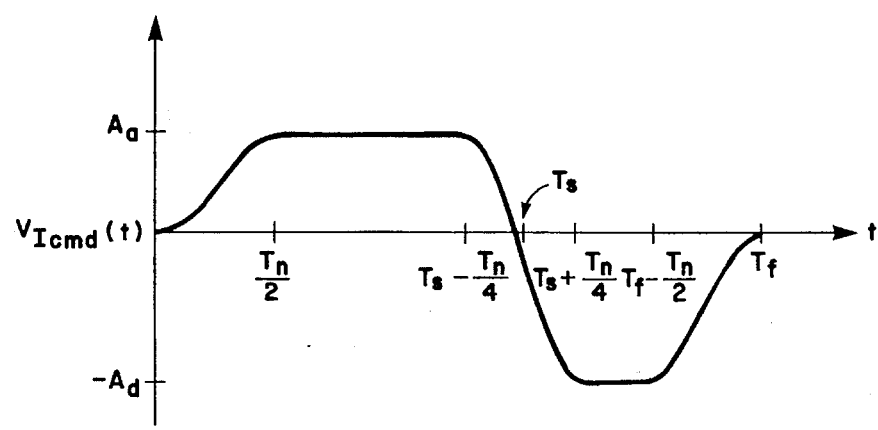
FIG. 5 is a plot of amplitude vs. time for a piecewise trigonometric input command signal.

Unwanted motion associated with changes in the position and velocity of the actuator arm are reduced and/or eliminated by generating an input current command $V_{Icmd}$ to control the current $i_a$ through coil 40 as the actuator arms 34 move to the desired angular position θ. The input current command $V_{Icmd}$ is a piecewise trigonometric (PWT) profile, as shown in FIG. 5. That is, the input current command $V_{Icmd}$ is characterized as a piecewise continuous function. A preferred example of a piecewise continuous function which provides a PWT input current signal $V_{Icmd}$ having a desirable profile is characterized by the following equations:

Thus, for a given move length and cosine frequency Ω, the PWT input current command $V_{Icmd}$ is fully specified by the switch time $T_s$ at which the current changes polarity, the final time $T_f$ at which the signal ceases to be driven, the acceleration amplitude $A_a$, and the deceleration amplitude $A_d$. The PWT input current command $V_{Icmd}$ is used to produce a motor coil current $i_a$ having controlled frequency content. The cosine frequency Ω is chosen so that the frequency spectrum of the PWT input command $V_{Icmd}$ is minimized in a specified frequency band. That is, the cosine frequency Ω is chosen so that the energy of the PWT input command $V_{Icmd}$ is concentrated below the lowest problematic frequencies which can excite flexible modes in the arm 34.

It is desirable to maximize the amplitude of the PWT input current command $V_{Icmd}$ in order to provide the fastest move time possible; however, if the applied voltage $V_{app}$ exceeds the system supply voltage capability, the error amplifier 44 will saturate (FIG. 3). It is important that this saturation not occur, as it results in discontinuities in the coil current $i_a$. Thus, the system is voltage limited, and parameters $A_a$ and $A_d$ are chosen such that a maximum supply voltage allowable within system parameters will be applied to the motor 36 for acceleration and deceleration of the arm 34. In general, to maximize performance, $A_a$ and $A_d$ will not be of equal magnitude because the back EMF voltage $V_e$ produced by the movement of the coil through the magnetic flux subtracts from the applied voltage $V_{app}$. Thus, during acceleration the applied voltage $V_{app}$ is positive and the back EMF voltage $V_e$ decreases the effective voltage $V_c$ across the motor coil. Conversely, during deceleration the applied voltage $V_a$ is negative and therefore the back EMF voltage $V_e$ increases the effective voltage $V_c$ across the motor coil.

Figure 6:
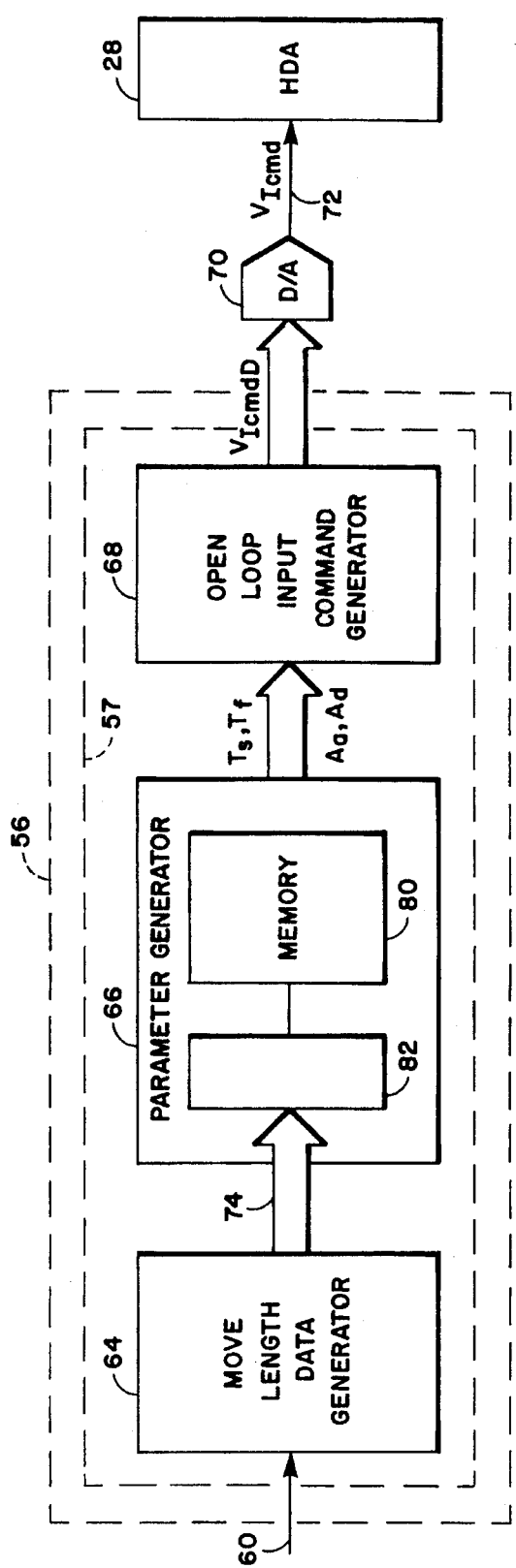
FIG. 6 is block diagram of an open loop servo controller.

Referring now to FIG. 6, the servo controller 56 is shown as an open loop servo 57. The open loop servo 57 includes a move length data generator 64 coupled to a parameter generator 66, which is coupled to an open loop input command generator 68 for generating a digital input command $V_{IcmdD}$. The open loop input command generator 68 is Equation 1

$$V_{Icmd}(\tau,\beta) = \begin{cases} \dfrac{A_a}{2}(1-\cos[\Omega\tau]) & 0 \leq \tau \leq \dfrac{T_n}{2} \\ A_a & \dfrac{T_n}{2} \leq \tau \leq T_s - \dfrac{T_n}{4} \\ \dfrac{(A_a+A_d)}{2}\cos[\Omega\tau+\phi_1] + \dfrac{(A_a-A_d)}{2} & T_s - \dfrac{T_n}{4} \leq \tau \leq -T_x + \dfrac{T_n}{4} \\ -A_d & T_s + \dfrac{T_n}{4} \leq \tau \leq T_f - \dfrac{T_n}{2} \\ -\dfrac{A_d}{2}(1-\cos[\Omega\tau+\phi_2]) & T_f - \dfrac{T_n}{2} \leq \tau \leq T_f \end{cases}$$

where:

Equation 2

$T_n = 2\dfrac{\pi}{\Omega}$.

$\beta = [T_s, T_f, A_a, A_d, \Omega]$ $\phi_1 = \Omega\left(\dfrac{T_n}{4} - T_s\right)$ $\phi_2 = \Omega(T_n - T_f)$ further coupled to a digital to analog convertor 70 which provides the PWT input current command $V_{Icmd}$ line 72 to the HDA 28.

The move length data generator 64 generates move length data on lines 74 corresponding to the desired change in position of the actuator arm 34. The move length data generator 64 accepts the destination track position data via lines 60 provided by the data controller 52 (FIG. 4) and compares it to the present position of the actuator arm 34 to provide the move length data on lines 74 to the parameter generator 66.

The parameter generator 66 uses the move length data on lines 74 to provide data corresponding to a switch time $T_s$, a final time $T_f$, an acceleration amplitude $A_a$, and a deceleration amplitude $A_d$. The parameter generator 66 is here conveniently implemented, for example, as a lookup table stored in a memory 80. The parameter generator 66 in addition optionally includes a register or latch 82 which is fed move length data from move length data generator 64. The move length data are here stored in register 82 and presented as an address to memory 80 which in response provides the parameters $T_s$, $T_f$, $A_a$, and $A_d$ as mentioned above. The memory 80 can be for example a ROM or RAM.

Thus at each addressable location are stored the switch time $T_s$, final time $T_f$, acceleration amplitude $A_a$, and deceleration amplitude $A_d$ values which are related to a given move length (or address). Hence, for a given actuator arm 34 move, the move length data on lines 74 are used to address the memory 80 and provide the stored switch time $T_s$, final time $T_f$, acceleration amplitude $A_a$, and deceleration amplitude $A_d$ required to fully specify the PWT input command $V_{Icmd}$. These parameters are presented to the open loop input command generator 68 as digital data.

The number of distinct locations needed in the memory 80 for storing the parameters $T_s$, $T_f$, $A_a$, and $A_d$ can be equal to the number of different possible values of the move length data. For example, there may be a location in memory 80 for storing the parameters corresponding to a move of the arm 34 from track 2 to track 5 on the disk 30, and there may be a separate location in memory 80 for storing the parameters corresponding to a move of the arm 34 from track 5 to track 2. Alternatively, fewer locations can be maintained if one set of parameters is stored in one location for a given move length regardless of position. For example, one location can be maintained for both the move from track 2 to track 5 and the move from track 5 to track 2, as well as a move from track 4 to track 7, as the move length is actually the same and only the direction of the move is different. Logic would then be provided for adjusting the polarity of the acceleration and deceleration amplitudes based on the direction of the move.

The parameter generator 66 could alternately be implemented as a digital signal processor, which is configured to quickly calculate the appropriate values of $T_s$, $T_f$, $A_a$, and $A_d$ for given move length data on lines 74. For example, a curve fitting analysis may be applied to obtain a functional description of the resultant parameter values for each given move length.

Now also referring back to FIG. 5, the open loop input command generator 68 provides an input signal using the switch time $T_s$, the final time $T_f$, the positive acceleration amplitude $A_a$, and the deceleration amplitude $A_d$ parameters from the parameter generator 66 as those parameters to fully specify a piecewise continuous function of the input signal vs. time. The switch time $T_s$ specifies a time at which the input signal changes polarity, the final time $T_f$ specifies a time at which the input signal is no longer driven, the acceleration amplitude specifies the maximum amplitude of the signal prior to changing polarity, and the deceleration amplitude specifies the minimum amplitude of the signal after changing polarity.

The open loop input command generator 68 is implemented by a standard digital signal processor configured to solve the above equations 1 and 2 which characterize the PWT input current command signal $V_{Icmd}$. That is, for each given switch time $T_s$, final time $T_f$, acceleration amplitude $A_a$, and deceleration amplitude $A_d$, a unique PWT input current command signal $V_{Icmd}$ is provided. Thus, the digital signal processor provides as outputs thereof a parallel series of digital bits $V_{ICMDd}$ specifying the amplitude of the PWT input current command signal $V_{Icmd}$ as a function of time.

The analog to digital convertor 70 converts the digital input current command $V_{ICMDd}$ provided from the open loop input command generator 68 as a series of digital bits to an analog input current command signal $V_{Icmd}$. The PWT input current command signal $V_{Icmd}$ is coupled to the coil 40 via the transconductance amplifier 42 (FIG. 2), and in response to the input current command signal $V_{Icmd}$ the actuator arms 34 are moved a radial distance θ in accordance with the value of the destination track position information received by the servo controller 56 from the data controller 52 on lines 60 (FIG. 4).

The servo controller 56 of FIG. 6 thus provides an open loop system for moving an actuator arm 34 in a HDA 28. A PWT input current command $V_{Icmd}$ is generated whose energy is concentrated below the lowest frequency associated with a problematic vibratory mode in the actuator 29. The current through coil 40 follows the PWT input current $V_{Icmd}$ and induces a torque τ which moves the arm 34 over a selected radial distance. The dynamic behavior of the position and velocity of the arm 34 are related to the frequency characteristics of the current $i_a$ through the coil 40 and thus to the frequency characteristics of the PWT input current command $V_{Icmd}$. Thus, undesirable affects on motion of the arm normally caused by the frequency content of conventional input command signals are avoided.

More specifically, the frequency Ω of the raised cosine function is chosen such that the energy of the resulting PWT input current command $V_{Icmd}$ is concentrated below the frequency of the lowest problematic vibratory mode of the actuator 29. Faster access times can result because there is no need to wait for mechanical oscillations of the arm 34 to decay after arriving on the desired data track. A further result of concentrating the energy of the input signal at lower frequencies is to reduce acoustical emissions in the audible range which may be unpleasant to the human ear.

In addition, the PWT input current command signal $V_{Icmd}$ is easily computed given only four parameters $T_s$, $T_f$, $A_a$, and $A_d$ for a chosen cosine frequency Ω. The amount of data storage needed to specify an input command for each potential move length is thereby tractable, thus permitting practical use of the PWT input current command $V_{Icmd}$ in high speed systems.

It may be preferable to implement a closed loop system because the characteristics of the components that comprise the HDA 28 and particularly the motor 36 will often change over time and vary due to manufacturing tolerances. For instance, as the temperature of the HDA 28 increases during use, the resistance value of the coil 40 increases and the flux B of the magnet 27 decreases, ultimately reducing the effectiveness of the motor 36 and thus the torque τ applied to the actuator arm 34.

Figure 7:
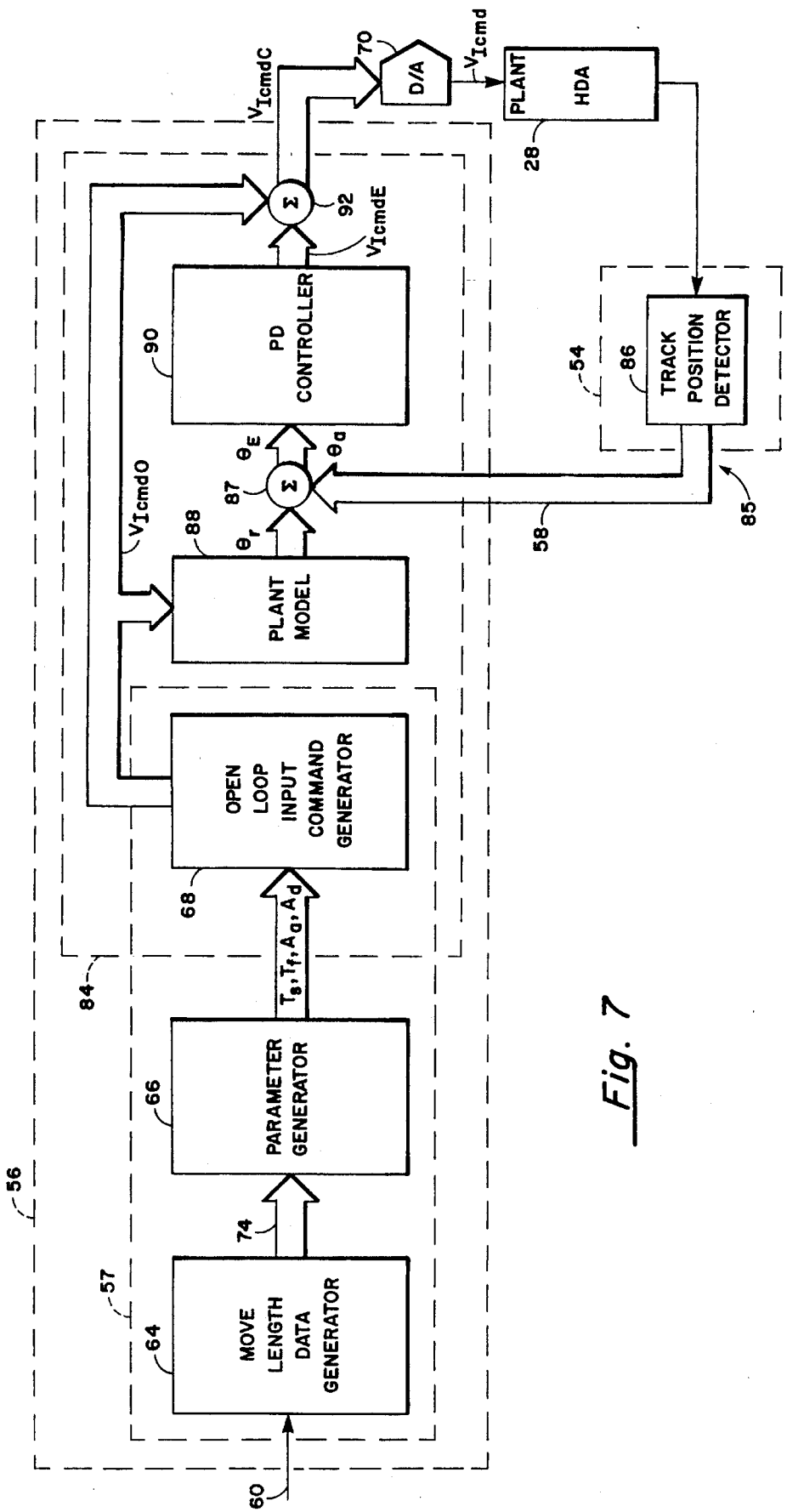
FIG. 7 is a block diagram of a closed loop servo controller including the open loop servo controller of FIG. 6.

Referring now to FIG. 7, the servo controller 56 is shown as a closed loop servo including the open loop servo 57. The closed loop servo 56 includes a closed loop input command generator 84 and a feedback circuit 85 including a track position detection system (TPD) 86 disposed within the read write channel 54 (FIG. 3). The TPD 86 is fed actuator arm position information from the magnetic head 32 read signal and provides in response thereto an actual position signal $\theta_a$ which is fed to a summer 87.

The track position detector 86 is conventionally implemented as a quadrature servo burst system which outputs an actual position signal $\theta_a$ in response to the location of the magnetic head 32 relative to the magnetic center of a track on the disk 30.

The closed loop input command generator 84 is shown to include the open loop input command generator 68 (FIG. 5), a model 88 of the HDA 28, hereinafter referred to as the plant model 88, and a compensator 90. The open loop input command generator 68 accepts as input the switch time $T_s$, final time $T_f$, acceleration amplitude $A_a$, and deceleration amplitude $A_d$ for specifying an open loop input command $V_{IcmdO}$. The open loop input command $V_{IcmdO}$ is fed to the plant model 88, which outputs in response a reference position value $\theta_r$. The reference position value $\theta_r$ is the predicted position of the actuator arm 34 in response to the open loop input command $V_{IcmdO}$. The reference position value $\theta_r$ is fed to the summer 87.

The reference position value $\theta_r$ is summed with the actual position signal $\theta_a$, resulting in an error position signal $\theta_E$ representing the difference between the expected position $\theta_r$ and the actual position $\theta_a$ which resulted from application of a corrected current command signal $V_{IcmdC}$ to the system. The error position signal $\theta_E$ is fed to the compensator 90. The error position signal $\theta_E$ is used by the compensator 90, a conventional proportional derivative controller, to generate an input correction command $V_{IcmdE}$. The input correction command $V_{IcmdE}$ is fed to summer 92 to be summed with the open loop input current command $V_{IcmdO}$, thus generating a digital closed loop input command signal $V_{IcmdC}$ which is fed to the digital to analog convertor 70. The digital to analog convertor 70 converts the digital $V_{IcmdC}$ signal to the PWT input current command signal $V_{Icmd}$ which is applied to the transconductance amplifier 42 (FIG. 3) of HDA 28.

As the characteristics of the HDA (the "plant") change over time, the actual position $\theta_a$ of the actuator arm 34 varies from the reference position $\theta_r$ predicted by the plant model 88. The compensation controller generates an input correction command $V_{IcmdE}$ in response to the difference between the actual and predicted position of the arm 34. The input correction command $V_{IcmdE}$ is added to the input command $V_{IcmdO}$ initially generated by the open loop input command generator 68 in order to adjust the input current command $V_{IcmdC}$ to compensate for the changing system characteristics.

Figure 8:
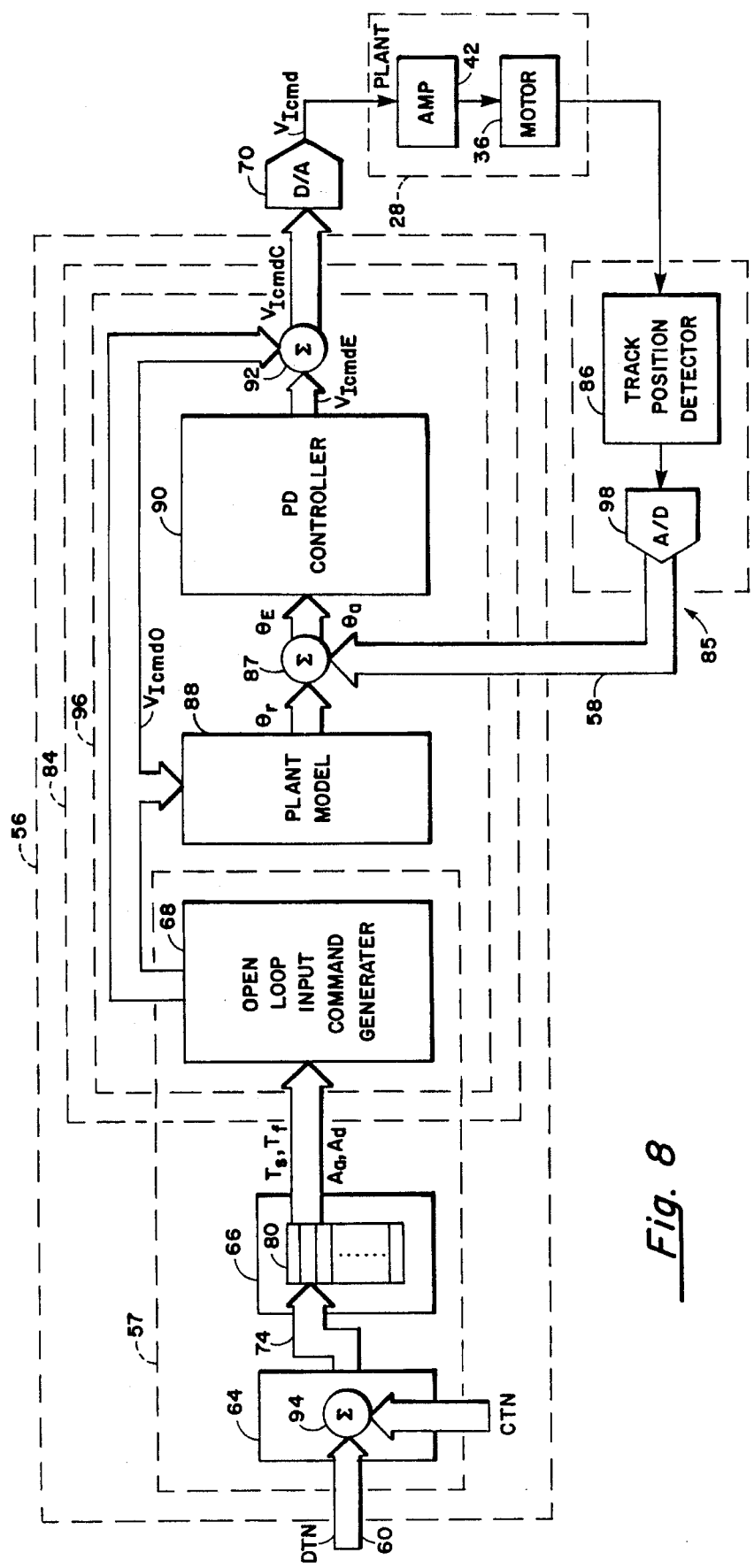
FIG. 8 is a more detailed block diagram of the closed loop servo controller.

Referring now to FIG. 8, an example of the closed loop servo 56 of FIG. 7 is shown to include the move length generator 64 as a summer 94 which accepts a digitally encoded destination track number received on lines 60 from the data controller 52 (FIG. 3). This encoded destination track number is summed with a digitally encoded current track number, which is either stored from the previous destination track number or provided by the data controller 52, to provide the move length data on lines 74.

The move length data on lines 74 is fed to the parameter generator 66, which contains the previously described register 82 and memory lookup table 80. The move length data on lines 74 is used as an address or index to fetch values from the memory 80. These values include as mentioned above a final time $T_f$, a switch time $T_s$, an acceleration amplitude $A_a$, and a deceleration amplitude $A_d$ which are here used to fully specify an open loop PWT input command for the given move length data on lines 74 and cosine frequency $\Omega$. These parameters are fed to the closed loop input command generator 84, which contains a digital signal processor 96.

The digital signal processor 96 (DSP 96) is configured to solve the input command generator 68 equations describing the open loop input command $V_{IcmdO}$. The DSP 96 is also configured to solve equations which represent the plant model 88, which is a model of the particular motor 36 being used, the particular transconductance amplifier 42, and the actual actuator arm 34. The DSP 96 thus accepts as inputs the parameters $T_s$, $T_f$, $A_a$, and $A_d$, and provides as output the open loop current command signal $V_{IcmdO}$. The DSP 96 then applies the open loop current command signal $V_{IcmdO}$ to the plant model 88 to provide as output a reference position $\theta_r$.

The DSP 96 is also configured to solve equations which represent the compensator 90. Thus, the DSP 96 also accepts as an input the actual position $\theta_a$ of the arm 34, which is summed by summer 87 with the reference position $\theta_r$ to provide an error position $\theta_E$ as a parameter for which the equations representing the compensator 90 model are solved. The solution to the compensator 90 equations provides an input correction command $V_{IcmdE}$. This input correction command $V_{IcmdE}$ is fed to the summer 92 to be summed with the open loop input command $V_{IcmdO}$, providing as output from DSP 96 a digital word representing the closed loop input current command $V_{IcmdC}$. The closed loop input current command $V_{IcmdC}$ is fed to the digital to analog convertor 70, which provides as output an analog PWT input current command signal $V_{Icmd}$.

The PWT input current command signal $V_{Icmd}$ is fed to the transconductance amplifier 42, which provides the current $i_a$ to drive the motor 36. The actual position of the arm 34 is tracked by the TPD 86 and the data controller 52. The position information obtained from the TPD 86 is typically provided as an analog signal and is fed to an analog to digital convertor 98, the output of which is fed to the DSP 96 as the actual position $\theta_a$ used for correcting the open loop input command $V_{IcmdO}$.

In order to specify the PWT input command $V_{Icmd}$ (FIG. 3) to be used for given move length, values for $\Omega$, $T_s$, $T_f$, $A_a$, and $A_d$ are chosen. The value of $\Omega$ is chosen such that the energy of the resulting PWT input command profiles is concentrated below the lowest problematic resonant frequency of the system. The $T_f$ and $T_s$ parameters depend on the given move length and on the acceleration and deceleration amplitudes $A_a$ and $A_d$. It is desirable that $T_f$ be as small as possible in order to move the actuator arm 34 as fast as possible, thus minimizing disk access time. However, if $T_f$ is too small, the magnitudes of $A_a$ and $A_d$ may be large enough such that saturation of the power amplifier 42 (FIG. 2) could result. $A_a$ and $A_d$ are therefore chosen such that maximum supply voltage is reached but not exceeded. $T_s$ marks the point at which the actuator arm 34 stops accelerating and begins decelerating. It is desirable to determine a set of optimal values for the four parameters to achieve the minimum move time of the actuator arm 34 without saturating the power amplifier 42.

These optimum values can be determined by an iterative process which determines unique values for $T_s$ and $T_f$ via a cost function method, while adjusting $A_a$ and $A_d$ until their maximum acceptable values are found. The cost function may be solved either analytically or, preferably, iteratively through use of a commercial simulation program such as Matrix X®.

The analytical method involves modeling the disk drive system to obtain a state variable description of the system to be controlled in response to an input command, and then using a cost function method based on the system state variables to determine unique values for $T_s$ and $T_f$ given a cosine frequency $\Omega$, a move length, and amplitudes $A_a$ and $A_d$. An iterative method is then used to find a solution for $T_s$ and $T_f$ associated with the maximal acceptable values for $A_a$ and $A_d$.

Figure 9:
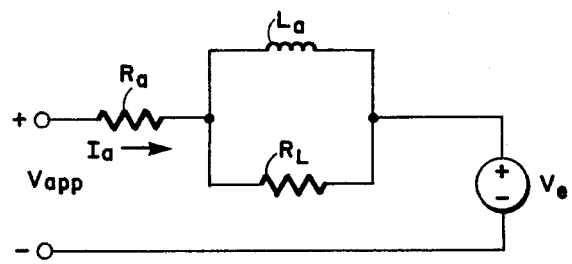
FIG. 9 is a circuit model of a motor for controlling an actuator arm in a disk drive.

First the system must be modeled in order to obtain a state variable description of the system and an appropriate cost function. Referring now to FIG. 9 there is shown a circuit model of the motor 36 (FIG. 2), where $V_{app}$ is the applied voltage feeding the motor, $R_a$ is the coil 40 resistance, $L_a$ is the coil 40 inductance, $R_l$ is the coil 40 reluctance, and $V_e$ is the back EMF voltage created by the movement of the coil 40 through the magnetic flux H. Since $R_l$ is typically many times larger than $R_a$, it may be neglected in describing the motor. Thus, the voltage across the coil, $V_c$, may be described as:

$$V_c = V_{app} - V_e = R_a i_a + L_a \frac{di_a}{dt} \ . \qquad \text{Equation 3}$$

It is also known that the force provided by the movement of the coil 40 through the magnetic field B is described by:

$$F = BNi_a l \qquad \text{Equation 4.}$$

Where B is the magnetic induction vector, N is the number of turns in the coil, and l is a vector whose magnitude is the effective length of the wire and whose direction is parallel to $i_a$ and orthogonal to B.

It is further known that the back EMF voltage $V_e$ produced by the movement of the coil through the magnetic field B is equal to the time rate of change of the magnetic flux through the area enclosed by the coil:

$$V_{emf} = \frac{d\phi_B}{dt} = -\frac{d}{dt}(BNl\theta) = -BNl\frac{d\theta}{dt} = -K_e \frac{d\theta}{dt} \ . \qquad \text{Equation 5}$$

where $\Phi_B$ is the magnetic flux enclosed by the coil, $\theta$ is angular position, and $K_e = BNl$ is identified as the back EMF constant.

It is also known that the torque applied to the actuator arm as a result of the force generated by the motor depends on the inertia of the actuator, so equating the two gives:

$$F = J\frac{d^2\theta}{dt^2} = BNli_a = K_T i_a. \qquad \text{Equation 6}$$

where J is the inertia of the actuator arm 34 and $K_T = BNl$ is identified as the torque constant of the motor.

An equation describing applied voltage as a function of angular position may now be written as a combination of the above equations:

$$V_{app} = K_e \frac{d\theta}{dt} + \frac{R_a J}{K_T}\frac{d^2\theta}{dt^2} + \frac{L_a J}{K_T}\frac{d^3\theta}{dt^3} \ . \qquad \text{Equation 7}$$

This time domain equation may be expressed in the frequency domain as a transfer function relating the angular position of the actuator arm 40 to the applied voltage $V_{app}$ may be written as:

$$\frac{\theta(s)}{V_{app}(s)} = \frac{\frac{K_T}{L_a J}}{s\left(s^2 + \frac{R_a}{L_a}s + \frac{K_T K_e}{L_a J}\right)} \ . \qquad \text{Equation 8}$$

Figure 10:
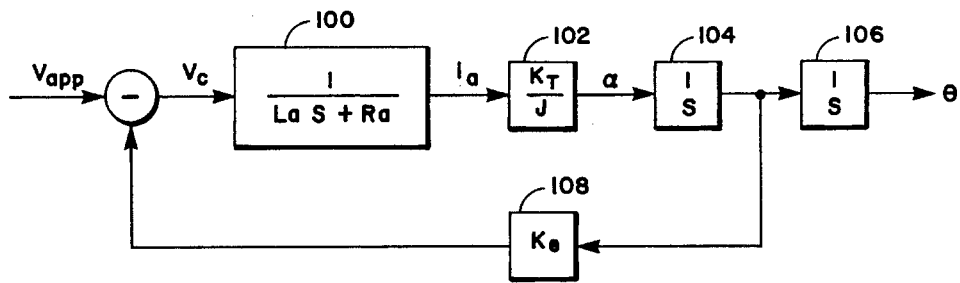
FIG. 10 is a block diagram of a model of the motor and actuator arm dynamics for an open loop system.

Referring now to FIG. 10 there is shown a block diagram of the motor which describes the output angular position $\theta$ in response to the applied voltage signal $V_{app}$ fed to the motor model. Block 100 represents the impedance of the motor coil 40 (FIG. 8). The coil current $i_a$ is produced in response to the applied voltage signal $V_{app}$ and the impedance 100 of the coil 40. As shown the coil current $i_a$ is fed to a block 102 which represents the torque $\tau$ produced on the actuator arm 34 resulting in angular acceleration $\alpha$. Blocks 104 and 106 represent the integration of angular acceleration to angular velocity $\omega$ (block 104), and the integration of angular velocity $\omega$ to angular position $\theta$ (block 106). The output of block 108 represents the back EMF voltage $V_e$ produced by the coil 40. The back EMF voltage $V_e$ is summed with the applied voltage $V_{app}$. From the foregoing model it is apparent that the frequency content of the output angular position $\theta$ will be related to the frequency content of the motor coil current $i_a$. Thus, it is desirable to control the frequency content of the motor coil current to reduce undesirable effects on angular position $\theta$ and angular velocity $\omega$.

Figure 11:
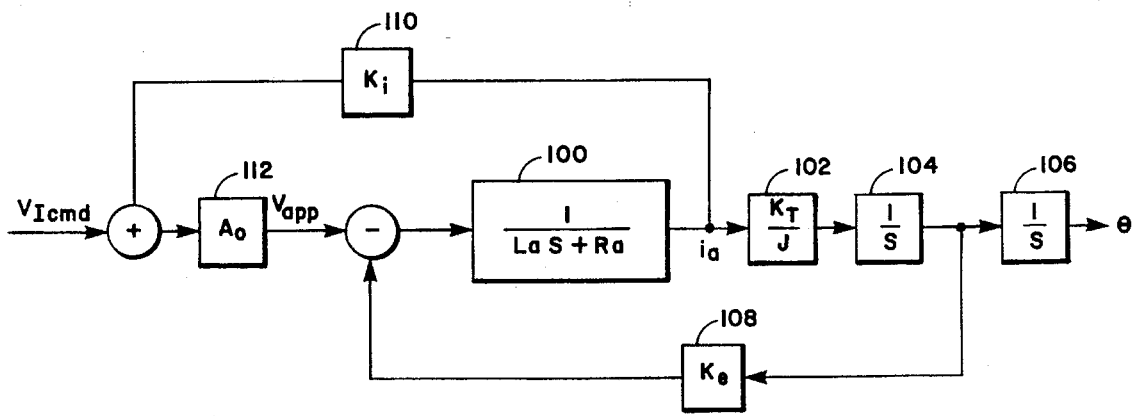
FIG. 11 is a block diagram of a model of the motor and actuator arm dynamics including current feedback.

Referring now to FIG. 11, the frequency content of the motor coil current is controlled by adding a current feedback circuit 109 including a current feedback amplifier 110 (feedback amplifier 50 of FIG. 3). The output of the amplifier 110 is summed with current input command $V_{Icmd}$ in order to induce a motor coil current $i_a$ which follows the shape of the input command $V_{Icmd}$. The use of the current feedback circuit 109 allows a current to be commanded rather than a voltage. The applied voltage $V_{app}$ to the motor is now provided as an output of a power amplifier 112. Thus, by providing an input current command $V_{Icmd}$ with a specified frequency content, the frequency content of the coil 40 current $i_a$ and thus of the output angular position $\theta$ is concomitantly specified.

Figure 12:
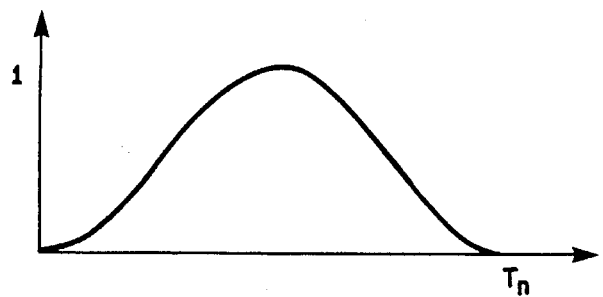
FIG. 12 is a plot of a raised cosine function.

Referring back to FIG. 5 and to Equations 1 and 2, the piecewise continuous input command signal described is based upon the raised cosine function:

$$\tfrac{1}{2}[1-\cos(\Omega t)] \quad 0 \leq t \leq T_n \qquad \text{Equation 9.}$$

one period of this function is shown in FIG. 12. The raised cosine function is a preferred function for use in constructing a PWT current input command $V_{Icmd}$ for three basic reasons: 1) the period extension of a raised cosine function is continuously differentiable; 2) the frequency content is selectable by adjusting the frequency parameter $\Omega$; and 3) the cosine function is easy to construct. A PWT current input command $V_{Icmd}$ is constructed in a piecewise manner using the raised cosine function of FIG. 12 concatenated with constant functions, as shown in FIG. 5. The PWT current input command $V_{Icmd}$ is continuously differentiable; that is, the derivatives of the concatenated pieces are equal where they meet. Specifying an input current command $V_{Icmd}$ as a series of concatenated raised cosine and constant functions as shown in FIG. 5 allows for asymmetrical acceleration and deceleration amplitudes and periods, which can be used to compensate for back EMF ($V_e$) effects in voltage limited systems.

Though the raised cosine function provides the preferred description of the PWT input current command $V_{Icmd}$, PWT profiles may also be described by other suitable functions to provide a piecewise continuously differentiable profile which can be constructed without undue difficulty; for example, by level and phase shifted sinusoids concatenated with constant functions, or by piecewise polynomials such as bezier curves.

For each possible given move length, the optimal final time $T_f$, switch time $T_s$, acceleration amplitude $A_a$, and deceleration amplitude $A_d$ parameters are found which will minimize access time. In a current limited system, limited only by the current capacity of the motor coil 40, $A_a$ and $A_d$ are fixed and only $T_s$ and $T_f$ need be found for a given move length. In a voltage limited system, where the voltage $V_{app}$ applied to the coil 40 is limited to prevent saturation of the power amplifier 112, optimal values for $A_a$ and $A_d$ must also be found.

In order to specify the input command, a state variable description of the system is useful. The dynamics of the system of FIG. 10 may be written in the time domain as $$\frac{d}{dt}\hat{X} = A\hat{X}(t) + bu(t). \qquad \text{Equation 10}$$

where $$\hat{X} = \begin{bmatrix} \theta(t) \\ \omega(t) \\ i_a(t) \end{bmatrix}, A = \begin{bmatrix} 0 & 1 & 0 \\ 0 & 0 & -\frac{K_T}{J} \\ 0 & -\frac{K_e}{L_a} & -\frac{(A_o K_i + R_a)}{L_a} \end{bmatrix}, \qquad \text{Equation 11}$$

$$b = \begin{bmatrix} 0 \\ 0 \\ \frac{A_o}{L_a} \end{bmatrix}.$$

The components of the state vector are angular position, angular velocity, and coil current.

The time domain solution to Equation 10 is in general:

$$\hat{X}(t) = e^{At}\hat{X}_o + \int_0^{T_f} e^{A(t-\tau)} bu(\tau)\, d\tau. \qquad \text{Equation 12}$$

This state vector solution can then be expanded by substituting the PWT input previously described in Equations 1 and 2 for the control input $u(\tau)$:

$$\hat{X}(t, T_s, T_f; \Omega) = e^{At}\hat{X}_o + \int_0^{\frac{T_n}{2}} e^{A(t-\tau)} b \cdot \qquad \text{Equation 13}$$

$$\frac{A_a}{2}(1 - \cos[\Omega\tau])d\tau + \int_{\frac{T_n}{2}}^{T_s - \frac{T_n}{4}} e^{A(t-\tau)} b \cdot A_a\, d\tau +$$

$$\int_{T_s - \frac{T_n}{4}}^{T_s + \frac{T_n}{4}} e^{A(t-\tau)} b \cdot \frac{(A_a + A_d)}{2}\cos[\Omega\tau + \phi_1] +$$

$$\frac{(A_a - A_d)}{2}d\tau - \int_{T_s + \frac{T_n}{4}}^{T_f - \frac{T_n}{2}} e^{A(t-\tau)} b \cdot A_d\, d\tau -$$

-continued $$\int_{T_f - \frac{T_n}{2}}^{T_f} e^{A(t-\tau)} b \cdot \frac{A_d}{2}(1 - \cos[\Omega\tau + \Phi_2])d\tau.$$

The state variables representing angular position $\theta$ and angular velocity $\omega$ are thus:

$$\theta(t, T_s, T_f; \Omega) = [1\ 0\ 0] \cdot \hat{X}(t, T_s, T_f; \Omega) \qquad \text{Equation 14}$$
$$\omega(t, T_s, T_f; \Omega) = [0\ 1\ 0] \cdot \hat{X}(t, T_s, T_f; \Omega).$$

The goal is to choose the parameters $T_s$ and $T_f$ for a given move length, cosine frequency $\Omega$, acceleration amplitude $A_a$, and deceleration amplitude $A_d$ such that the system state vector is 0 for all time after $T_f$ (assuming the move is from some position $\theta$ to the origin); i.e. such that any residual errors in angular velocity $\omega$ and angular position $\theta$ are minimal. The smallest possible value for the final time $T_f$ would result from a square wave "bang-bang" function; however, using this function as an input command would result in significant residual position and velocity errors which may increase access time. It has been found that the response of the system model to a PWT current input for a specific move length yields minimum residual position and velocity errors for a unique set of time parameters $T_s$ and $T_f$. The parameters $T_s$ and $T_f$ may be determined simultaneously through a single minimization of a cost function J:

$$\min_{T_s, T_f} J = \min_{T_s, T_f} \frac{1}{2} \int_{T_f}^{T_\infty} \overline{X} M \overline{X}^T dt. \qquad \text{Equation 15}$$

The components of the vector $\overline{X}$ are the state variables to be minimized. Since the residual error in the current state variable $i_a(t)$ will be minimized by the current feedback amplifier, once the command input becomes zero, only the angular position $\theta(t)$ and the angular velocity $\omega(t)$ need be included in the minimization. Thus, $$\hat{X} = [\theta(t, T_s, T_f; \Omega)\omega(t, T_s, T_f; \Omega)], \quad M = \begin{bmatrix} 1 & 0 \\ 0 & \rho \end{bmatrix}. \qquad \text{Equation 16}$$

and the cost function J is taken to be $$J(T_s, T_f; \omega) = \qquad \text{Equation 17}$$

$$\frac{1}{2} \int_{T_f}^{T_\infty} [\theta^2(t, T_s, T_f; \omega) + \rho\omega^2(t, T_s, T_f; \omega)] dt.$$

Since in this case the residual error in angular velocity is equally as important as the residual error in angular position, the weighting factor $\rho$ is taken as unity.

The solution to the problem of minimizing the cost function J gives time parameters $T_s$ and $T_f$ which are sufficient to fully specify an input command current $V_{Icmd}$ for a system which is not voltage limited; that is, where the positive amplitude $A_a$ and negative amplitude $A_d$ are chosen based on coil current limitations. Specifically, in a current limited system, $A_a$ and $A_d$ are specified respectively as the maximum positive and negative current capabilities of the coil 40 each multiplied by the gain of the transconductance amplifier 42 (FIG. 3), subject to adjustments for desired performance.

The $T_s$ and $T_f$ parameters can also be obtained iteratively for example by use of a Powell minimization algorithm utilizing a numerical simulation program such as Matrix X®. With such a program, the user models the system schematically through a graphical interface. The software generates a mathematical model of the entered schematic for numerical solution. The user enters a description of an input profile which the program then uses to stimulate the model and simulate the output. From an arbitrary set of initial conditions, this simulation can be iterated until the cost function is minimized providing optimal $T_s$ and $T_f$ parameters.

Many physical systems including high performance disk drives like the HDA 28 have supply voltage and power constraints. If a current is required which results in an applied voltage $V_{app}$ larger than the supply voltage that is available, the power amplifier 112 (see FIG. 2, error amplifier 44) will saturate. It is important that saturation of the power amplifier 112 not occur, else the voltage saturation will cause discontinuities in coil current, resulting in the excitation of vibratory modes. Moreover, for large angular velocities the effect of the back EMF voltage $V_e$ becomes significant when supply voltage is limited. To negate this effect, it is desirable that the positive and negative command amplitudes be allowed to vary independently.

Thus for systems with limited voltage supplies, an iterative optimization process utilizing the minimization of equation 14 is used to determine the appropriate acceleration and deceleration command amplitudes $A_a$ and $A_d$ in addition to the time parameters $T_s$ and $T_f$.

The applied voltage $V_{app}$ is a function of the PWT input command $V_{Icmd}$ and coil current $i_a$, and is given by $$V_{app}(t) = A_o[u(t,\beta) - K_i i_a(t)] \qquad \text{Equation 18.}$$

Thus, maximum applied voltage may be determined for both acceleration and deceleration as:

$$V_{app}^+ \equiv \max_{t^+} V_{app}(t), \qquad 0 \le t^+ \le T_s \qquad \text{Equation 19}$$

$$V_{app}^- \equiv \max_{t^-} |V_{app}(t)|, \qquad T_s \le t^- \le T_f$$

Figure 13:
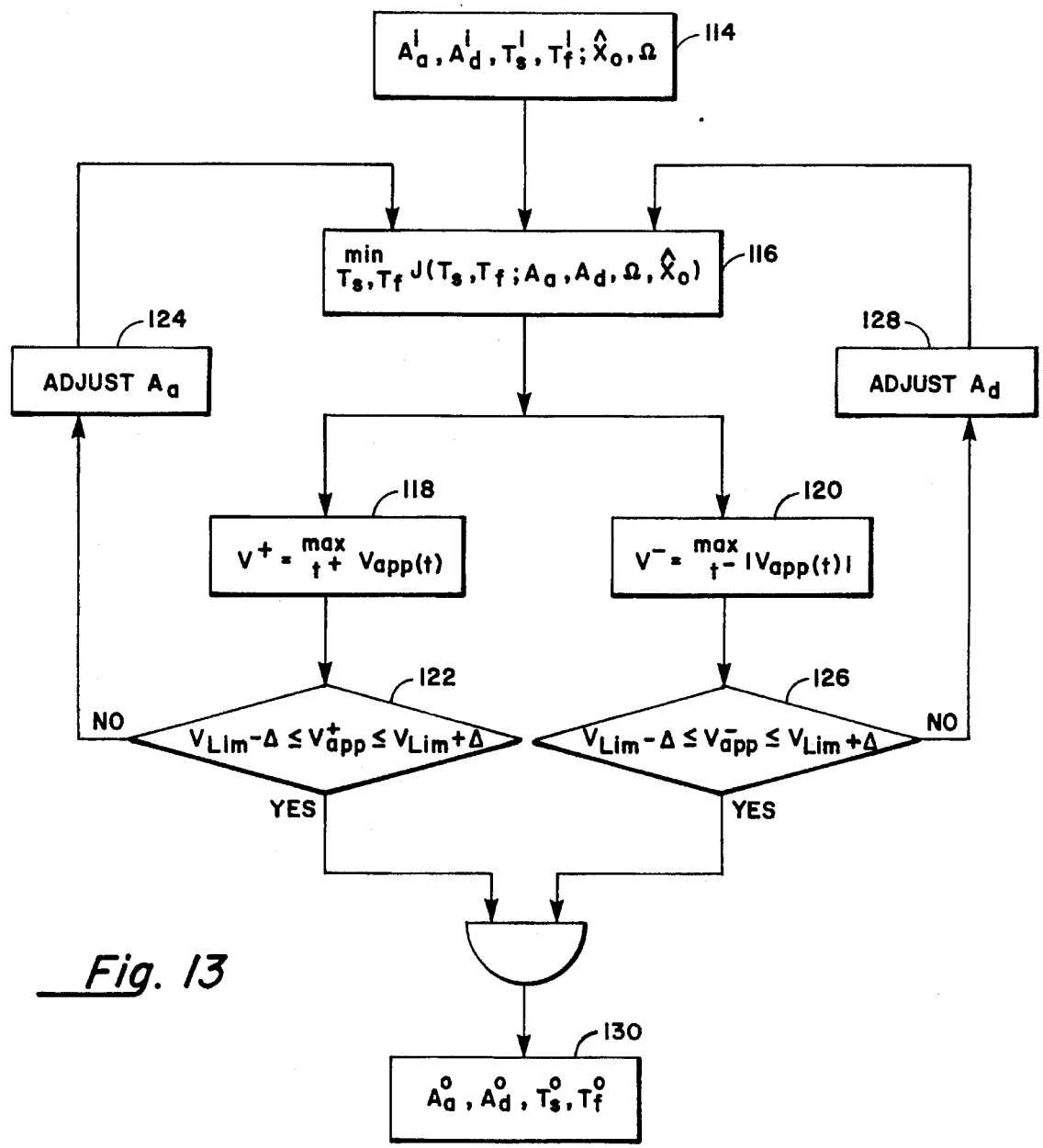
FIG. 13 is a flow diagram of an iterative process for finding the parameters which specify a suitable piecewise trigonometric input command.

The system supply voltage limit $V_{Lim}$, the system supply voltage tolerance $\Delta$, and the cosine frequency $\Omega$ are provided as inputs to an iterative process which provides all four PWT input command $V_{Icmd}$ parameters as outputs. Referring now to the flow chart of FIG. 13:

---
Iterative Solution
---

1. Make initial guesses for each of the $V_{Icmd}$ command parameters $A_a$, $A_d$, $T_s$, and $T_f$ based on the given initial condition $X_o$, raised cosine frequency $\Omega$ supply voltage limit $V_{Lim}$, and supply voltage tolerance $\Delta$; (FIG. 13 block 114)
2. Minimize the cost function of equation 14 to obtain a switch tim $T_s$ and final time $T_f$; (block 116)
3. Determine the peak applied voltages $V_{app}^+$ and $V_{app}^-$; (blocks 118 and 120)
4. Compare peak voltage during acceleration with the specified limit: (blocks 122 and 124)
    a. if $V_{app}^+ > (VLim + \Delta)$ then reduce the acceleration amplitude $A_a$ by some $\epsilon$;
    b. If $V_{app}^+ < (VLim - \Delta)$ then increase the acceleration amplitude $A_a$ by some $\epsilon$;
    c. If $(VLim - \Delta) < V_{app}^+ < (VLim + \Delta)$ then hold $A_a$ value.
5. Compare peak voltage during deceleration with the specified limit: (blocks 126 and 128)

---
-continued

Iterative Solution
--- a. If $V_{app}^- > (VLim + \Delta)$ then reduce the deceleration amplitude $A_d$ by some $\epsilon$;
    b. If $V_{app}^- < (VLim - \Delta)$ then increase the deceleration amplitude $A_d$ by some $\epsilon$;
    c. If $(VLim - \Delta) < V_{app}^- < (VLim + \Delta)$ then hold $A_d$ value.
6. Repeat steps 2 through 5 until both 4c and 5c are true. (Block 130)

The command amplitude adjustments are chosen such that they reflect the error between the peak supply voltage and the specified limit. They are given by, $$A_a^{n+1} = A_a^n - K_i \frac{(V_{app}^+ - V_{Lim})}{R_a} \qquad \text{Equation 20}$$

$$A_d^{n+1} = A_d^n - K_i \frac{(V_{app}^- - V_{Lim})}{R_a}.$$

where the voltage error is divided by the coil resistance to approximate the corresponding error in coil current. The appropriate scaling is achieved by multiplying the estimated current error by the feedback gain $K_i$ of the current feedback amplifier 110.

Example Application

The previously described technique is simulated for physical parameters similar to those of state-of-the-art magnetic disk drives:

$R_a$=4.78 ohms
$L_a$=1.71×10$^{-3}$ henrys
$K_T$=37 oz-in/A
$K_e$=7.06×10$^{-3}$ $K_T$ volt-sec/rad
$J$=13.30×10$^{-3}$ oz-in-sec$^2$ The forward power amplifier 112 gain $A_o$ and feedback current amplifier 110 gain $K_i$ are also chosen. Unity feedback is used for simplicity, resulting in an input command which is scaled to be equal to the desired coil current $i_a$. The forward current amplifier 112 gain $A_o$ is made large to nullify inductance lag of the coil: Thus, $A_o$=100
$K_i$=1

The voltage supply of the disk drive is assumed to be limited to 12 volts. The voltage limits are set slightly below the available supply; e.g., $V_{Lim}$=11.65 V with a tolerance of $\Delta$=0.05 V.

Figure 14:
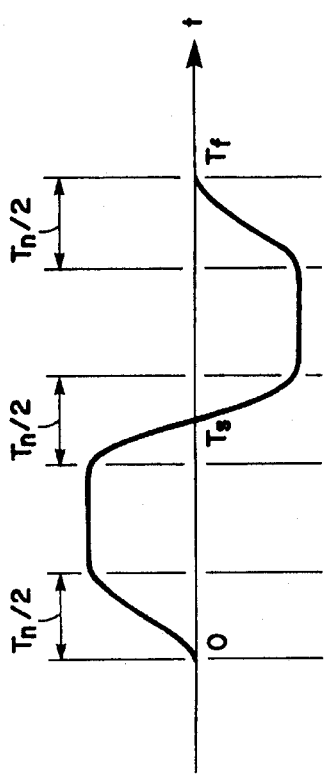
FIG. 14 is an example of a piecewise trigonometric input command.

For an angular move for example of 0.0295 radians, the initial conditions are defined as:

$$X_o = \begin{bmatrix} \theta_o \\ \omega_o \\ i_{ao} \end{bmatrix} = \begin{bmatrix} -0.0295 \\ 0 \\ 0 \end{bmatrix}. \qquad \text{Equation 21}$$

where the origin is the final state. Left to be specified is the raised cosine frequency $\Omega$. Referring now to FIG. 14, If for example there are no significant vibratory modes below 1 Khz, then choosing a cosine frequency $f_n=\Omega/2\pi$=500 Hz provides that the coil current $i_a$ is never commanded to change its value in less than 0.001 seconds.

An initial guess of 2 amperes is used for the positive and negative command amplitudes $A_a$ and $A_d$.

Minimizing the cost function of Equation 16 at step 2 of the iterative solution to obtain intermediate $T_s$ and $T_f$ values may be approached practically through use of a commercial simulation program such as Matrix X®, as mentioned above. The iterative solution may be implemented as a Matrix X® program which executes the major iteration listed above, executing step 2 as a minor iteration.

Figure 15:
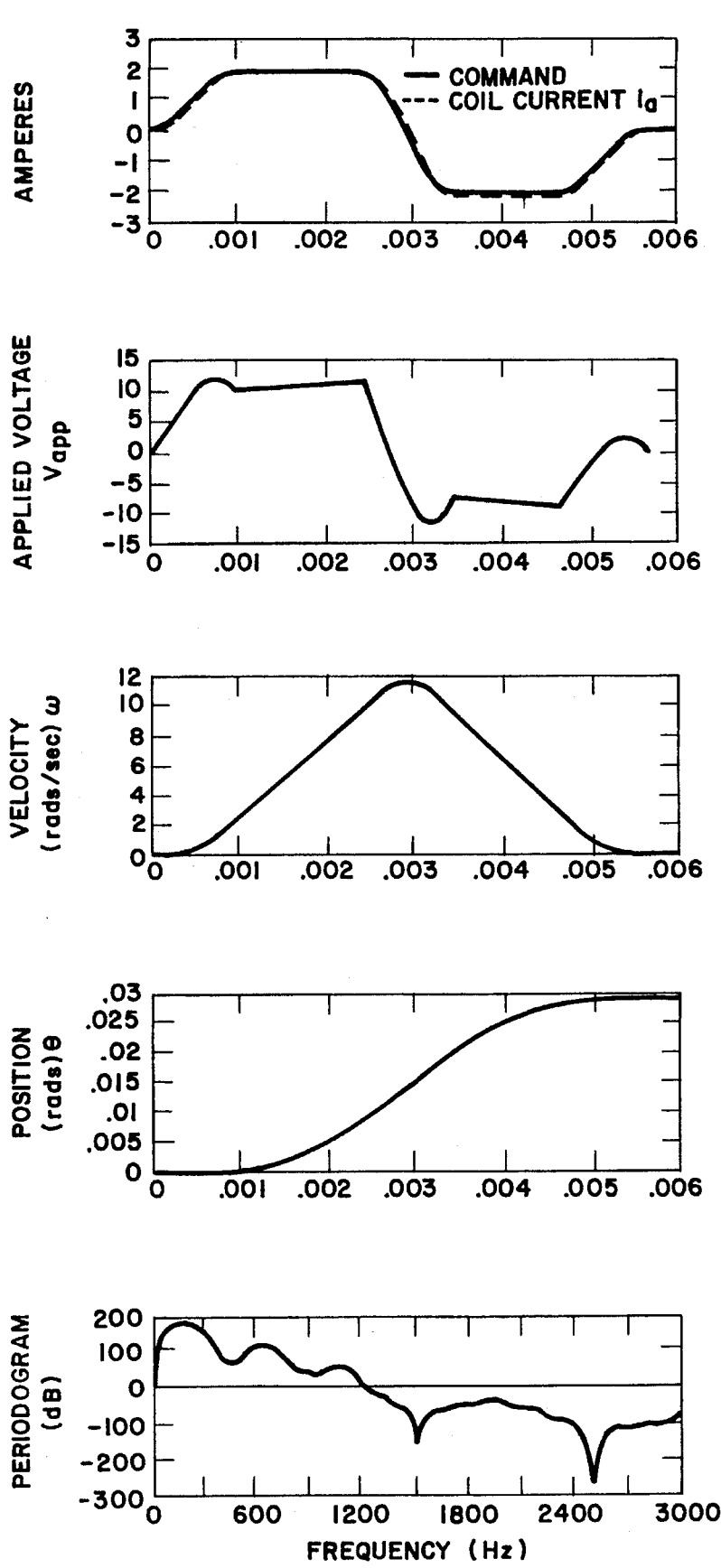
FIG. 15 presents a series of plots of amplitude vs. time of various system parameters resulting from the simulation of an open loop disk drive system in response to a piecewise trigonometric input command.

The above iterative solution provides the following optimal parameters:

$A_a°$=1.88 A $T_s°$=2.926 ms $V_{app}^+$ 11.67 V $A_d°$=2.03 A $T_f°$=5.633 ms $V_{app}^-$ 11.62 V Referring now to FIG. 15, there is shown the simulated response of the system. The system of FIG. 10 can be simulated numerically for example by using Matrix X®. The current commanded by the PWT input current command $V_{Icmd}$, coil current $i_a$, applied voltage $V_{app}$, angular velocity $\omega$, and position $\theta$ are shown as a function of time. Also shown is a periodogram of the coil current $i_a$.

Figure 16:
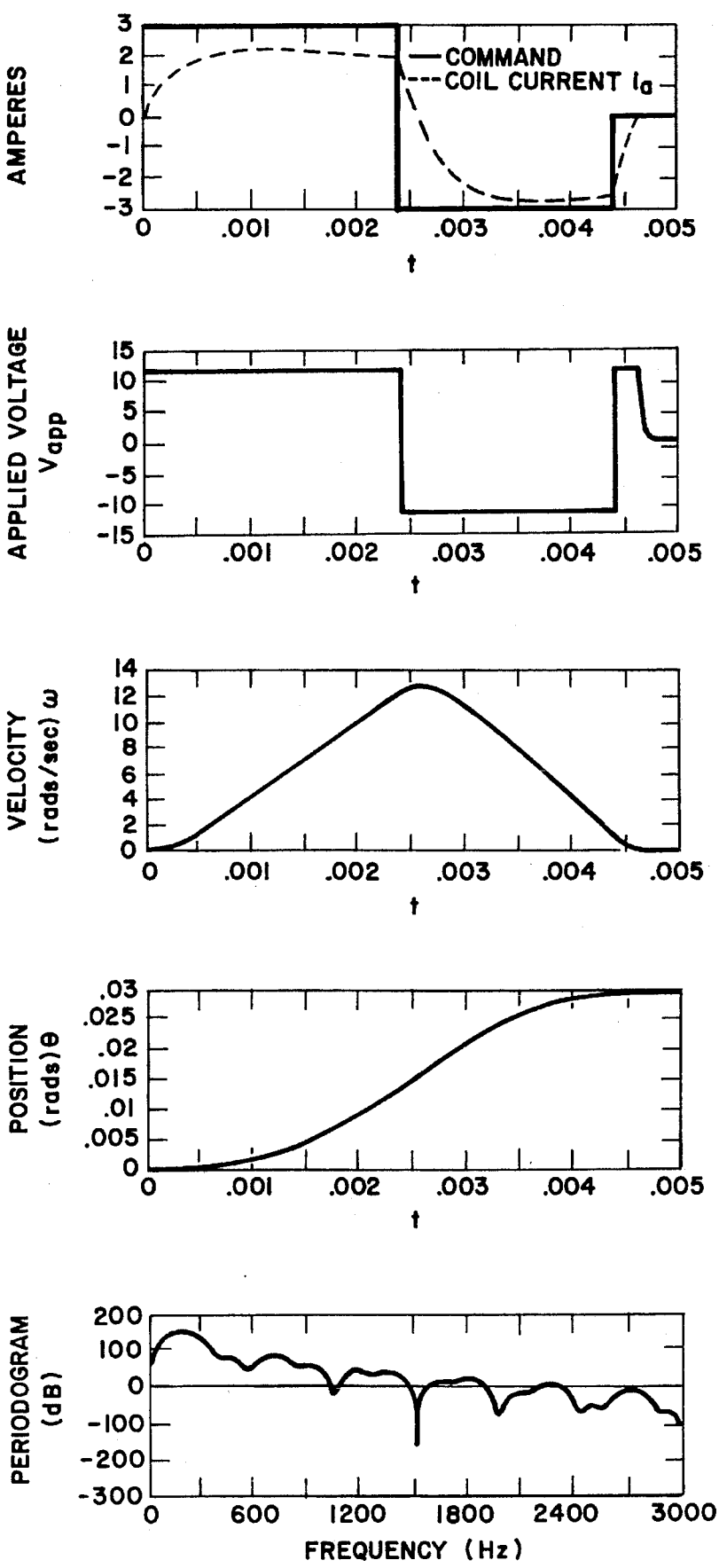
FIG. 16 presents a series of plots of amplitude vs. time of various parameters resulting from the simulation of an open loop disk drive system in response to a square wave input command.

Referring now to FIG. 16, there are shown for purposes of comparison the same parameters as a result of a square wave "bang-bang" input. Also shown is a periodogram of the coil current $i_a$ for the "bang-bang" input.

It is important to note that the "bang-bang" input results in sharp changes in the coil current $i_a$, resulting in broadbanded spectral energy as shown by the periodogram. In contrast, the periodogram of the coil current resulting from the PWT input current command $V_{Icmd}$ shows no energy above 0 db for frequencies greater than the first odd harmonic of $f_n$. Moreover, significant attenuation is shown in the region around the odd harmonics of $f_n$. This attenuation suggests that, as well as limiting broad-banded spectral energy, specific vibratory modes may be suppressed by adjusting the cosine frequency parameter $f_n$.

Referring back to FIG. 8, in practice the values for $T_s$, $T_f$, $A_a$, and $A_d$ are stored in the memory 80. The DSP 96 is configured to solve the equations describing the PWT command input.

Resonant Modes

Figure 17:
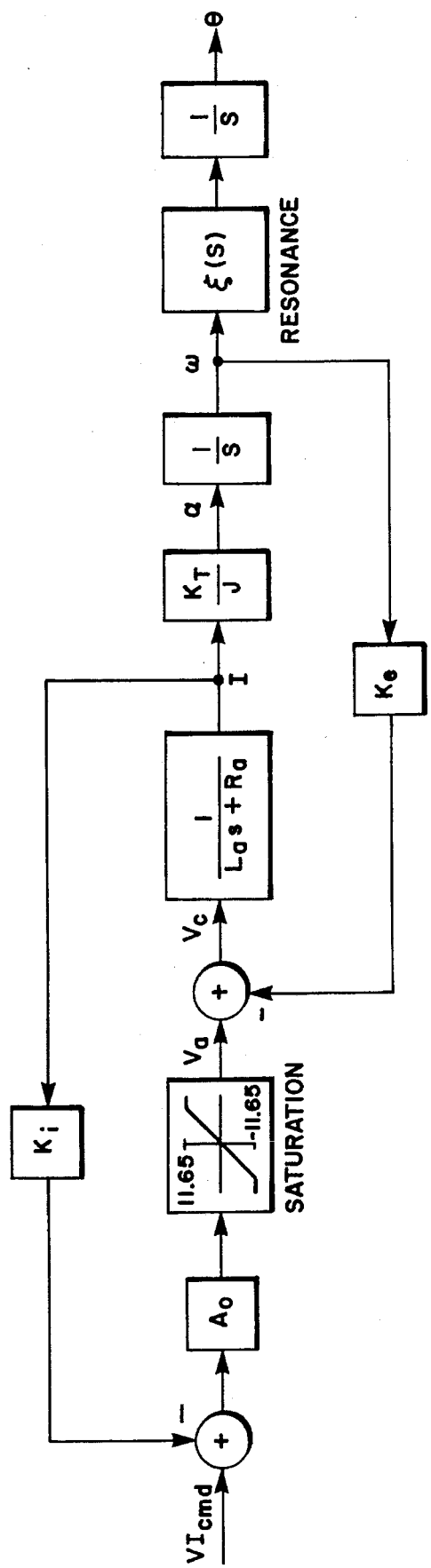
FIG. 17 is a block diagram of a model of the open loop system including resonant modes.
Figure 18:
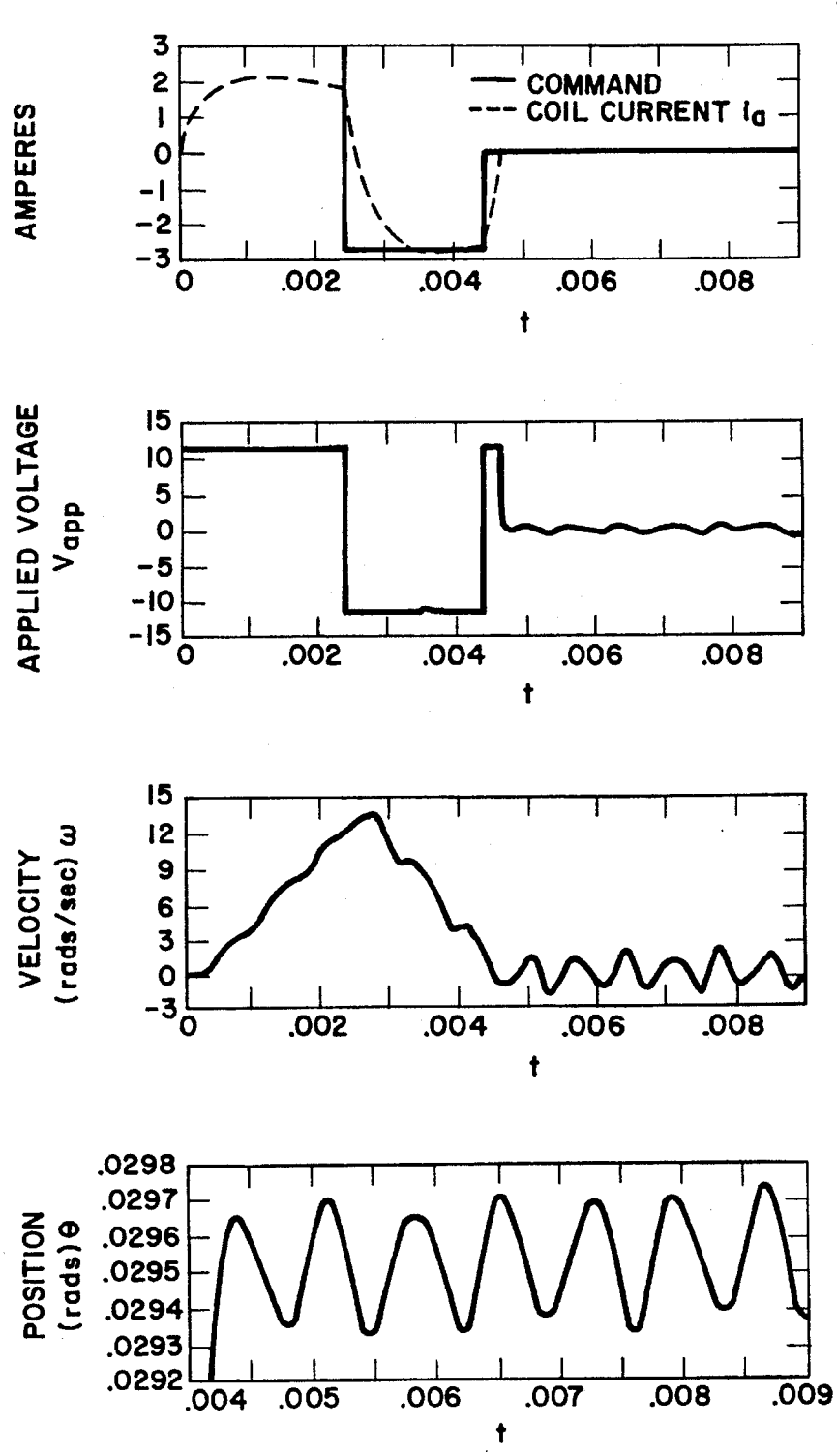
FIG. 18 presents a series of plots of amplitude vs. time of various system parameters resulting from the simulation of an open loop disk drive system including resonant modes in response to a square wave input command.

The HDA 28 is further subject to resonant modes due to the inherent flexibility of the actuator arm 34. The PWT input current command signal $V_{Icmd}$ induces minimal excitation of these resonant modes. Referring now to FIG. 17, there is shown a model of the HDA 28 including resonances $\xi(s)$. The transfer function $\xi(s)$ for purposes of example is a combination of three lightly damped resonant modes having resonant frequencies of 1.4 kHz, 2.25 kHz, and 2.7 kHz respectively. Referring to FIG. 18, there are shown simulation plots of command and coil currents $V_{Icmd}$ and $i_a$, applied voltage $V_{app}$, angular velocity $\omega$, and position $\theta$ versus time for a square "bang-bang" command $V_{Icmd}$. All system parameters are the same as for the system example previously described. Note that the resonant modes result in residual oscillations in angular velocity $\omega$ and angular position $\theta$. Although the destination angle of 0.0295 radians is first reached within 4.5 ms, the peak to peak oscillation which follows would be equivalent to three full data tracks in today's high density disk drives, which is unacceptable for proper read or write operation.

Figure 19:
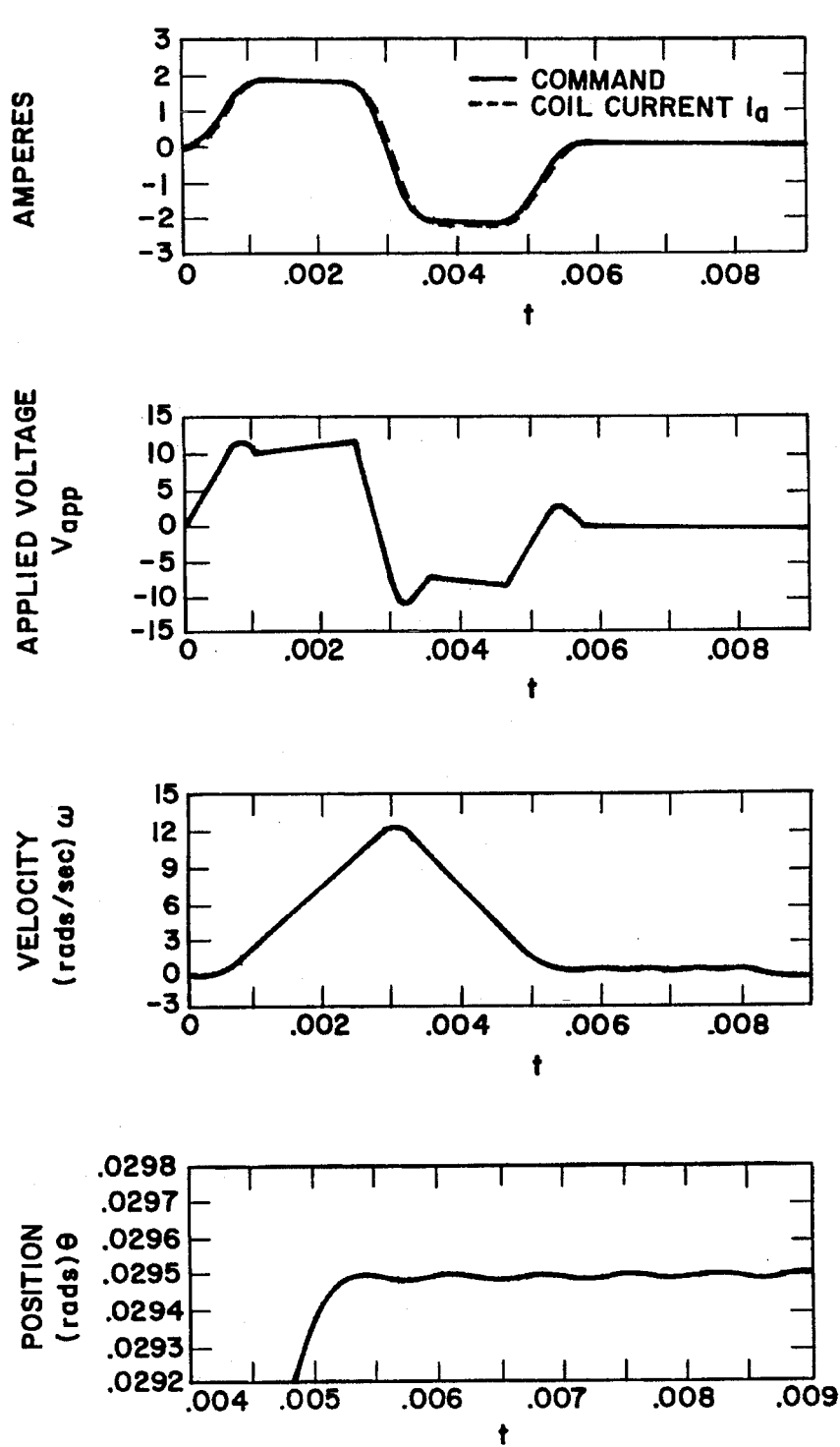
FIG. 19 presents a series of plots of amplitude vs. time of various system parameters resulting from the simulation of an open loop disk drive system including resonant modes in response to a piecewise trigonometric input command.

Referring now to FIG. 19, there are shown simulation plots of the same parameters versus time for a PWT command input $V_{Icmd}$ with a cosine frequency $f_n$ of 500 Hz. In contrast to the previous simulation of a square wave response, the angular velocity $\omega$ and angular position $\theta$ states exhibit only a small amount of residual oscillation. The value of the angular position state variable reaches the desired angle in approximately 5.3 ms; however, since residual oscillation is minimal (within 10% of a data track in today's high density disk drives), the HDA 28 would be able to read or write immediately. Thus, using a PWT command input instead of a square wave command input for systems with resonant modes may significantly improve system performance.

Closed Loop Implementation

In real systems, the actual physical parameters may vary considerably from their nominal values, resulting in variations in the state variable trajectories which may lead to incorrect final conditions. Feedback may be used to compensate for these errors.

In the HDA 28, the resistance of the motor coil is a function of its length, cross-sectional area, conductivity, etc.. These characteristics will vary due to manufacturing tolerances. The $I^2R$ losses in the coil produce heat which result in resistance changes as large as 15%. Magnetic flux magnitude may also vary significantly. Due to the size constraints on the magnet in the HDA 28, the magnet is restricted from extending far beyond the angular range of the coil. Thus, the torque constant of the motor degrades for actuator angles near its outer ranges. These variations in system parameters can cause significant error in the final angular position and angular velocity states. A closed loop correction system is therefore provided to compensate for these errors.

Figure 20:
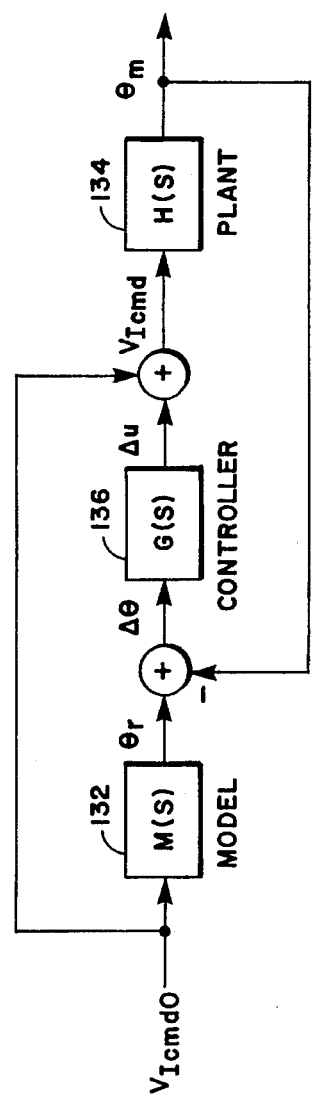
FIG. 20 is a block diagram of a model of a closed loop disk drive system using model reference control with feedforward.

To correct for these errors without degrading the properties of PWT commands, a model reference control with feedforward is used. Referring now to FIG. 20, there is shown a block diagram of this type of system. The model block M(s) (132), hereinafter the plant model, is the same model of the actuator dynamics and current amplifier that was used to determine the open loop PWT profile parameters. The input u, the PWT command, is injected into the plant model M(s) and directly into the real system, or real plant H(s) (134). The angular position trajectory $\theta r(t)$ obtained from the model is used as a reference for the real plant trajectory to follow. The error in trajectories $\Delta\theta$ is fed into a simple proportional-derivative controller G(s) (136). The output of the controller $\Delta u$ becomes a correction term that is summed with the feedforward term.

Referring back to FIG. 8, in practice the values for $T_s$, $T_f$, $A_a$, and $A_d$ are stored in the memory 80. The DSP 96 is configured to solve the state variable equations describing the plant model, the equations describing the PD controller, and the equations describing the PWT command input.

Figure 21:
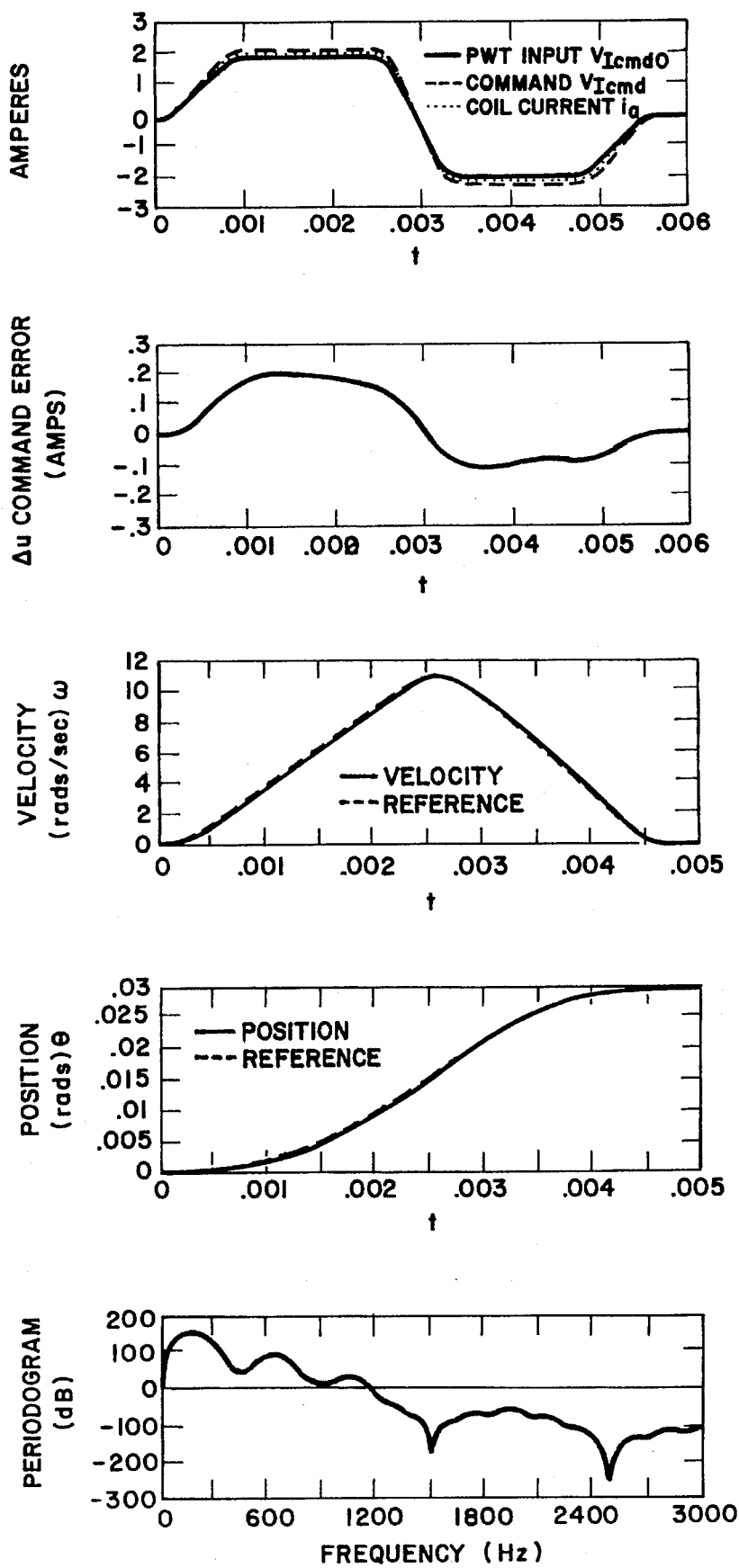
FIG. 21 presents a series of plots of amplitude vs. time of various system parameters resulting from the simulation of the closed loop disk drive system of FIG. 18 including resonant modes in response to a piecewise trigonometric input command.

Referring now to FIG. 21, the plots shown are the results of a time simulation of the closed loop system, given a plant with resonant modes and varying parameters typical of present disk drive technology. The command error is small relative to the total command input, and its shape is similar to the desired PWT command shape. As a result, the velocity and position trajectories follow the reference trajectories closely without exciting the resonant modes.

Though the PWT command input has been discussed in terms of its application to high density disk drive technology, it is suitable for use in any system where it is desirable to minimize the frequency content of a driving signal. For example, PWT command inputs are applicable to robotics. A PWT command input could be provided to move a robotic arm while reducing the excitation of resonant modes in the arm.

Figure 22:
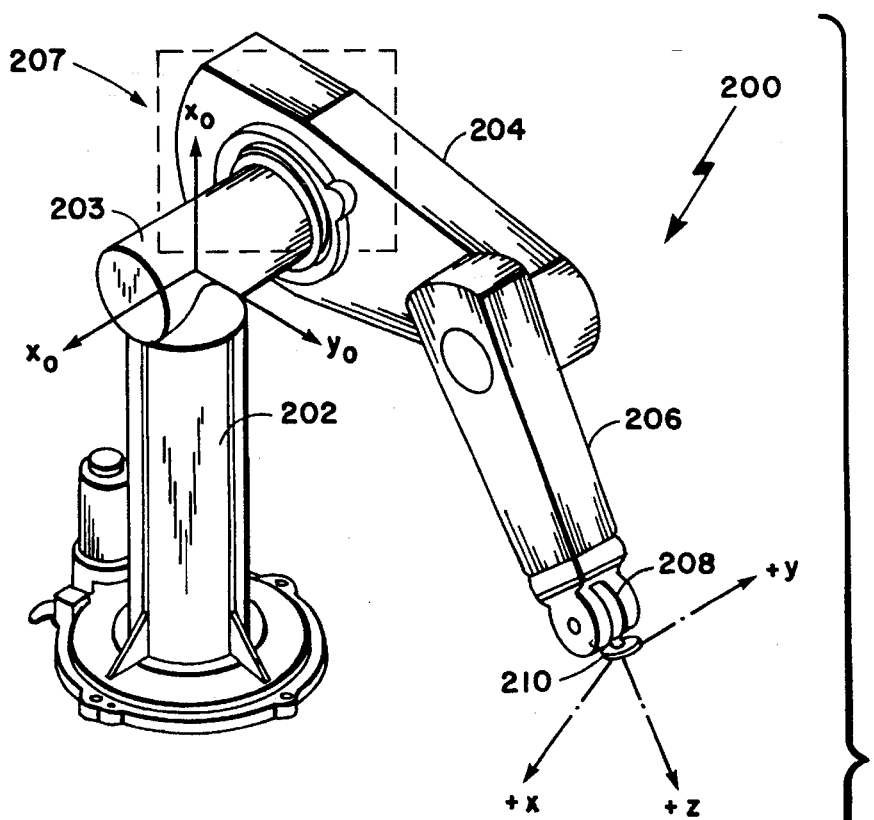
FIG. 22 is a line drawing of a robotic arm.
Figure 22:
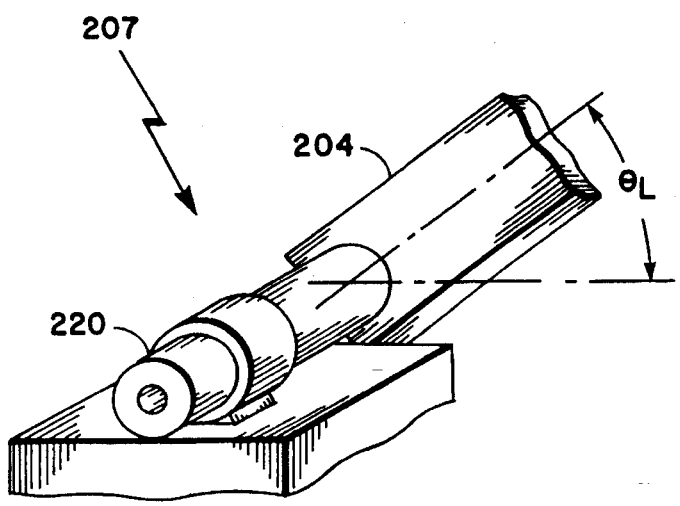

Referring now to FIG. 22, there is shown an industrial robot 200. Base linkage 202 supports rotatably mounted center linkage 203 for rotation in the horizontal plane. An upper arm 204 is rotatably mounted to center linkage 203 at joint 207 for rotation in the vertical plane. Lower arm 206 is rotatably mounted to upper arm 204 for further vertical motion. Joints 208 and 210 provide fine vertical and horizontal motion for carrying out the industrial application. Joint 207 is shown in FIG. 22 to further include motor and gears 220 for rotating the upper arm 204 through angular position $\theta_L$.

It is important that residual error in the angular position $\theta_L$ of the upper arm 204 be minimized, as any error in position $\theta_L$ will be magnified through the further linkages, translating to errors possibly preventing proper operation of the robot for a given application. Thus, it is desirable to provide a PWT input command for controlling motion of the upper arm 204.

Figure 23:
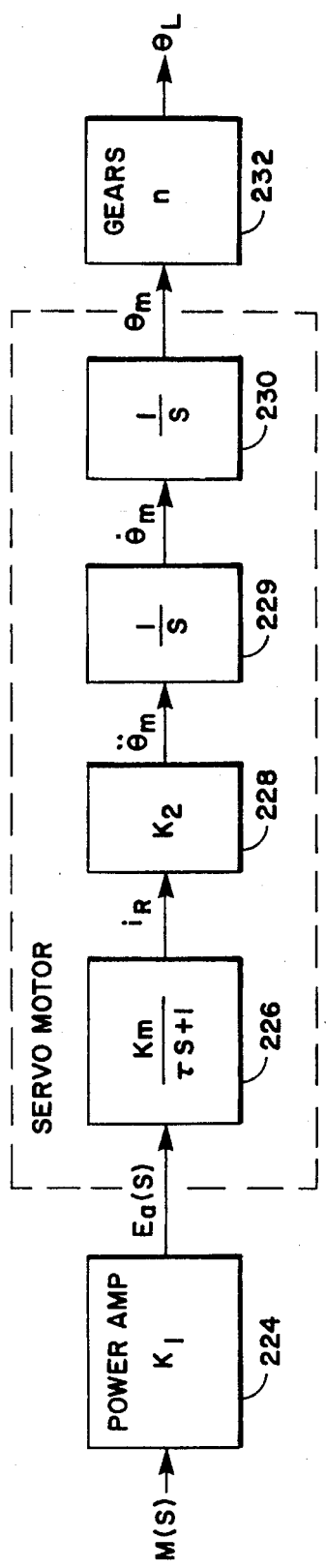
FIG. 23 is a block diagram of a model of the robotic arm.

Referring now to FIG. 23, a model 222 of the robot arm joint 207 is shown. Armature inductance is ignored, thus a second-order model of the motor is assumed. In this model, $E_a(s)$ is the armature voltage, used to control the position of the arm. An input signal $M(s)$ is driven through a power amplifier 224 with gain K1 for driving the motor. The motor dynamics of block 226 relate the resulting motor current $i_R$ to the armature voltage $E_a(s)$. Block 228 represents a force or torque constant relating the motor current $i_R$ to the resultant acceleration [!\$]\$¨g$\ddot{v}_m$ of the motor shaft 223. Block 229 is an integration of the acceleration [!\$]\$¨g$\ddot{v}_m$ providing velocity $\theta_m$, and block 230 is an integration of the velocity $\theta_m$ providing the output angular position $\theta_L$ of the motor shaft 223. Block 232 applies the gear ratio n to the angular position of the motor shaft 223, resulting in the output angular position of the arm 206.

Figure 24:
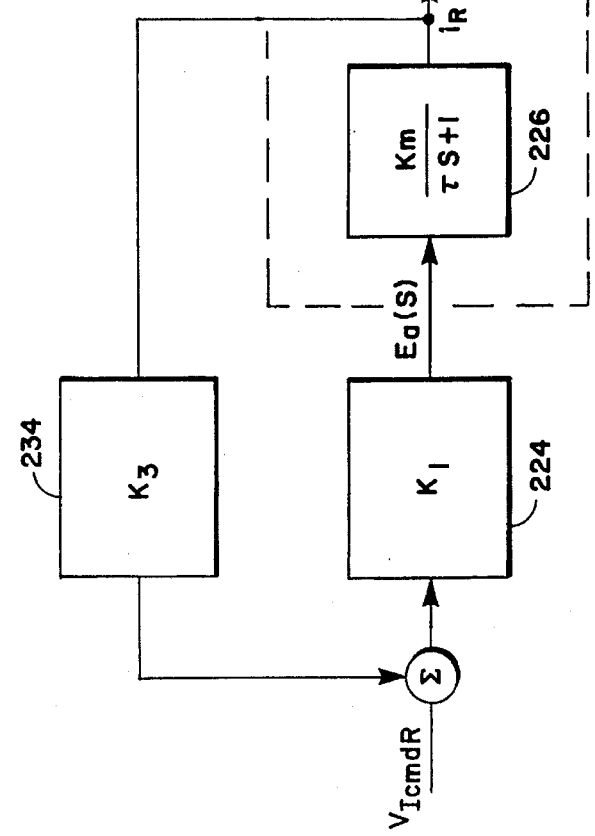
FIG. 24 is a block diagram of a model of the robotic arm including current feedback.

As in the disk drive position output previously described, undesirable frequency content of the motor current $i_R$ may cause undesirable motion in the robot arm. Thus, it is desirable to control the frequency content of the motor current $i_R$. Referring now to FIG. 24, as was done for the disk drive, the motor current $i_a$ is fed back through a current feedback amplifier 234 with gain $K_3$ and summed with an input current command $I_{cmdR}$. The current input command $I_{cmdR}$ has a PWT profile, and is described by a switch time $T_s$, a final time $T_f$, an acceleration amplitude $A_a$, and a deceleration amplitude $A_d$.

This model 222 of the robot joint 207 is used to obtain a state variable description of the robot joint 207, relating the output angular position $\theta_L$ of the upper arm 204 to the input current command $I_{cmdR}$. A cost function may then be minimized to obtain the final time $T_f$ and switch time $T_s$ of the input current command $I_{cmdR}$ given the acceleration and deceleration amplitudes $A_a$ and $A_d$, the cosine frequency $\Omega$, and a desired move length of the arm 204. Alternatively, the model 222 may be entered into a commercial simulation program, such as Matrix X®, and the cost function solved iteratively.

In order to prevent saturation of the feedback amplifier 234 in a voltage limited system, the iterative solution previously presented is executed to find the optimal parameters $T_f°$, $T_s°$, $A_a°$, and $A_d°$ to provide a PWT command input $I_{cmdR}$ for a given change in angular position $\theta_L$ of the robot arm 204. A closed loop system could be further provided for compensating for variations over time in the motor dynamics.

Having described preferred embodiments of the invention, it will now become apparent that other embodiments incorporating its concepts may be used. For example, though PWT command inputs have been described for use in an HDA, they are equally applicable to optical disk systems. Moreover, PWT command inputs can be useful in any application which requires a mass to be driven by any type of motor such that it moves from one point to another point quickly and without residual vibration. Accordingly it is felt that the invention should not be limited to the disclosed embodiments but rather should be limited only by the spirit and scope of the appended claims.

What is claimed is:

1. A method of moving a member to a desired position in a system including the member and a motor for moving the member, the method comprising the steps of:

(a) selecting the desired position for the member;

(b) generating an input signal characterized as a piecewise trigonometric function of time specified by a final time, a switch time, an acceleration amplitude, and a deceleration amplitude, the piecewise trigonometric function of time comprising concatenated cosine and constant functions; and (c) applying the input signal to the motor for driving the motor to move the member to the desired position, wherein the final time, the switch time, the acceleration amplitude and the deceleration amplitude are parameters related to the desired position for the member.

2. A method of generating a piecewise trigonometric function of time for use as an input signal in a system, the input signal producing voltages within the system, the piecewise trigonometric function of time being specified by values representing a final time, a switch time, an acceleration amplitude, and a deceleration amplitude, the values being contained in a memory, the method comprising the steps of iteratively:

(a) choosing an acceleration amplitude and a deceleration amplitude;

(b) obtaining the switch time and final time for the chosen acceleration and deceleration amplitude; and (c) adjusting the acceleration amplitude and deceleration amplitude until the system operates within predetermined operating conditions, comprising the steps of:

(i) determining peak positive and negative applied voltages resulting from the input signal; and (ii) adjusting the acceleration amplitude and deceleration amplitude until the peak positive and negative applied voltages lie within predetermined respective voltage ranges.

3. The method of claim 2 wherein the step of adjusting the acceleration amplitude and deceleration amplitude until the peak positive and negative applied voltages lie within predetermined respective voltage ranges comprises the step of adjusting the acceleration amplitude and deceleration amplitude until the magnitudes of the peak positive and negative applied voltages are less than the magnitude of the system supply voltage plus the magnitude of the system supply voltage tolerance.

4. A method of using a motor to move a movable member comprising the steps of:

providing data related to a desired final position of the movable member;

obtaining a switch time parameter and a final time parameter corresponding to the data related to the desired final position of the movable member;

generating an input signal using the switch time and final time parameters to specify a piecewise trigonometric function of time for said input signal, the piecewise trigonometric function of time comprising concatenated cosine and constant functions, the switch time parameter specifying a time at which the input signal changes polarity, and the final time parameter specifying a time at which the input signal is no longer generated;

feeding the input signal to the motor; and driving the motor in accordance with the fed input signal to move the movable member to the desired final position.

5. The method of claim 4 further comprising the steps of:

using the generated input signal to provide a predicted position signal for the movable member;

providing an actual position signal for the movable member by detecting the present position of the movable member;

comparing the actual position signal to the predicted position signal to provide an error position signal; and providing a corrected input signal in accordance with the error position signal and the generated input signal;

and wherein said step of feeding comprises feeding the corrected input signal to the motor.

6. The method of claim 5 wherein the step of providing a corrected input signal comprises the step of:

adjusting the input signal in response to the error position signal.

7. The method of claim 5 wherein the step of providing a corrected input signal comprises the steps of:

generating an input adjustment signal in response to said error position signal; and comparing said input adjustment signal and said generated input signal to provide said corrected input signal.

8. A method of using a motor to move a movable member comprising the steps of:

providing data related to a desired final position of the movable member;

obtaining a switch time parameter, a final time parameter, an acceleration amplitude parameter, and a deceleration amplitude parameter corresponding to the data related to the desired final position of the movable member;

generating an input signal using the switch time, final time, acceleration amplitude, and deceleration amplitude parameters to specify a piecewise trigonometric function of time as said input signal, the piecewise trigonometric function of time comprising concatenated cosine and constant functions, the switch time parameter specifying a time at which the input signal changes polarity, and the final time parameter specifying a time at which the input signal is no longer generated;

feeding the input signal to the motor; and driving the motor in accordance with the fed input signal to move the movable member to the desired final position.

9. The method of claim 8 wherein the acceleration amplitude and the deceleration amplitude have different magnitudes.

10. The method of claim 8 wherein a first time period corresponding to a time between when the input signal is initially generated and the switch time is different than a second time period corresponding to a time between the switch time and the final time.

11. The method of claim 8 further comprising the steps of:

using the generated input signal to provide a predicted position signal for the movable member;

providing an actual position signal for the movable member by detecting a present position of the movable member;

comparing the actual position signal to the predicted position signal to provide an error position signal; and providing a corrected input signal in accordance with the error position signal and the generated input signal;

and wherein said step of feeding comprises feeding the corrected input signal to the motor.

12. The method of claim 11 wherein the step of providing a corrected input signal comprises the step of:

adjusting the input signal in response to the error position signal.

13. The method of claim 11 wherein the step of providing a corrected input signal comprises the steps of:

generating an input adjustment signal in response to said error position signal; and comparing said input adjustment signal and said generated input signal to provide said corrected input signal.

14. An apparatus for using a motor to move a movable member comprising:

means for providing data related to a desired final position of the movable member;

means responsive to the data for providing a switch time parameter and a final time parameter corresponding to the data related to the desired final position;

means for generating an input signal using the switch time and final time parameters to specify a piecewise trigonometric function of time as said input signal, the piecewise trigonometric function of time comprising concatenated cosine and constant functions, the switch time parameter specifying a first time at which the input signal changes polarity, and the final time parameter specifying a second time at which the input signal is no longer generated; and means for feeding the input signal to the motor to move the movable member to the desired final position.

15. The apparatus of claim 10 further comprising:

means responsive to the generated input signal for providing a predicted position signal for the movable member;

means for providing an actual position signal for the movable member by detecting a present position of the movable member;

means for comparing the actual position signal to the predicted position signal to provide an error position signal; and means for providing a corrected input signal in accordance with the error position signal and the generated input signal;

and wherein said means for feeding comprises:

means for feeding the corrected input signal to the motor.

16. The apparatus of claim 15 wherein the means for providing a corrected input signal comprises:

means for adjusting the input signal in response to the error position signal.

17. The apparatus of claim 15 wherein the means for providing a corrected input signal comprises:

means for generating an input adjustment signal in response to said error position signal; and means for comparing said input adjustment signal and said generated input signal to provide said corrected input signal.

18. An apparatus for using a motor to move a movable member comprising:

means for providing data related to a desired final position of the movable member;

means responsive to the data for providing a switch time parameter, a final time parameter, an acceleration amplitude parameter, and a deceleration amplitude parameter corresponding to the data related to the desired final position;

means for generating an input signal using the switch time, final time, acceleration amplitude, and deceleration amplitude parameters to specify a piecewise trigonometric function of time as said input signal, the piecewise trigonometric function of time comprising concatenated cosine and constant functions, the switch time parameter specifying a first time at which the input signal changes polarity, and the final time parameter specifying a second time at which the input signal is no longer generated; and means for feeding the input signal to the motor to move the movable member to the desired final position.

19. The apparatus of claim 18 wherein the acceleration amplitude and the deceleration amplitude have different magnitudes.

20. The apparatus of claim 18 wherein a first time period corresponding to a time between when the input signal is initially generated and the switch time is different than a second time period corresponding to a time between the switch time and the final time.

21. The apparatus of claim 18 further comprising:

means responsive to the generated input signal for providing a predicted position signal for the movable member;

means for providing an actual position signal for the movable member by detecting a present position of the movable member;

means for comparing the actual position signal to the predicted position signal to provide an error position signal; and means for providing a corrected input signal in accordance with the error position signal and the generated input signal;

and wherein said means for feeding comprises:
means for feeding the corrected input signal to the motor.

22. The apparatus of claim 21 wherein the means for providing a corrected input signal comprises:

means for adjusting the input signal in response to the error position signal.

23. The apparatus of claim 21 wherein the means for providing a corrected input signal comprises:

means for generating an input adjustment signal in response to said error position signal; and means for comparing said input adjustment signal and said generated input signal to provide said corrected input signal.

24. Apparatus for using a motor to move an actuator arm in a disk drive member comprising:

means for providing data related to a desired final position of the actuator arm;

a memory coupled to the means for providing data, said memory storing a switch time parameter, a final time parameter, an acceleration amplitude parameter, and a deceleration amplitude parameter corresponding to the data;

means coupled to said memory for generating an input signal using the switch time, final time, acceleration amplitude, and deceleration amplitude parameters to specify a piecewise trigonometric function of time as said input signal, the switch time parameter specifying a first time at which the input signal changes polarity, and the final time parameter specifying a second time at which the input signal is no longer generated;

means responsive to the generated input signal for providing a predicted position signal for the actuator arm;

means for providing an actual position signal for the actuator arm by detecting the present position of the actuator arm;

means for comparing the actual position signal to the predicted position signal to provide an error position signal;

means for generating an input adjustment signal in response to said error signal;

means for comparing said input adjustment signal and said generated input signal to provide a corrected input signal; and means for feeding the corrected input signal to a motor to move the actuator arm.

25. A method of generating a piecewise trigonometric function of time comprising concatenated cosine and constant functions, for use as an input signal in a system including a motor driven by the input signal for moving a movable member, the piecewise trigonometric function of time being specified by values representing a final time, a switch time, an acceleration amplitude, and a deceleration amplitude, the values being contained in a memory, the method comprising the steps of iteratively:

(a) choosing an acceleration amplitude and a deceleration amplitude;

(b) obtaining the switch time and final time for the chosen acceleration and deceleration amplitudes; and (c) adjusting the acceleration amplitude and deceleration amplitude until the system operates within predetermined operating conditions.

26. A method of generating a piecewise continuous function of time for use as an input signal in a system, the input signal producing voltages within the system, the piecewise trigonometric function of time being specified by values representing a final time, a switch time, an acceleration amplitude, and a deceleration amplitude, the values being contained in a memory, the method comprising the steps of:

(a) choosing an acceleration amplitude and a deceleration amplitude;

(b) obtaining the switch time and final time for the chosen acceleration and deceleration amplitudes;

(c) determining peak positive and negative applied voltages resulting from the input signal;

(d) increasing the acceleration amplitude if the peak positive applied voltage is less than a positive voltage limit minus a voltage tolerance;

(e) decreasing the acceleration amplitude if the peak positive applied voltage is greater than the positive voltage limit plus the voltage tolerance;

(f) holding the acceleration amplitude if the positive voltage limit minus the voltage tolerance is less than the positive applied voltage, and the positive voltage limit plus the voltage tolerance is greater than the positive applied voltage;

(g) increasing the deceleration amplitude if the peak negative applied voltage is less than a negative voltage limit minus the voltage tolerance;

(h) decreasing the deceleration amplitude if the peak negative applied voltage is greater than the negative voltage limit plus the voltage tolerance; and (i) holding the deceleration amplitude if the negative voltage limit minus the voltage tolerance is less than the negative applied voltage, and the negative voltage limit plus the voltage tolerance is greater than the negative applied voltage.

* * * * *